US012301756B1

(12) United States Patent
Olejar, Jr. et al.

(10) Patent No.: US 12,301,756 B1
(45) Date of Patent: May 13, 2025

(54) METHODS AND SYSTEMS FOR AN EMERGENCY RESPONSE DIGITAL ASSISTANT

(71) Applicant: RAPIDSOS, INC., New York, NY (US)

(72) Inventors: James Patrick Olejar, Jr., Fort Lauderdale, FL (US); Angela Lynn Orthmeyer, Brooklyn, NY (US); Conor Fucci, Brooklyn, NY (US); Anish Saraogi, New York, NY (US); Michael John Martin, Long Island City, NY (US); John Robert Katt, New York, NY (US); Martin Andres Minnoni, Buenos Aires (AR); Daniel Richard Seidberg, Manlius, NY (US)

(73) Assignee: RAPIDSOS, INC., New York, NY (US)

( * ) Notice: Subject to any disclaimer, the term of this patent is extended or adjusted under 35 U.S.C. 154(b) by 0 days.

(21) Appl. No.: 18/915,858

(22) Filed: Oct. 15, 2024

Related U.S. Application Data

(60) Provisional application No. 63/679,100, filed on Aug. 3, 2024, provisional application No. 63/648,475, filed on May 16, 2024.

(51) Int. Cl.
*H04M 3/51* (2006.01)
*H04M 3/523* (2006.01)
*H04M 11/04* (2006.01)

(52) U.S. Cl.
CPC ....... *H04M 3/5116* (2013.01); *H04M 3/5183* (2013.01); *H04M 3/5235* (2013.01);
(Continued)

(58) Field of Classification Search
None
See application file for complete search history.

(56) References Cited

U.S. PATENT DOCUMENTS 11,218,584 B2   1/2022   Martin
11,689,653 B2   6/2023   Martin
(Continued)

OTHER PUBLICATIONS

LangChain. Q&A with RAG. Available at https://python.langchain.com/docs/tutorials/rag/. (29 pgs.)(Accessed Jun. 2024).
(Continued)

*Primary Examiner* — Hemant S Patel
(74) *Attorney, Agent, or Firm* — William J. Pigott; Michael L. Ross

(57) ABSTRACT

An emergency response assistant system may generate emergency response insights and provide the insights to an emergency responder application for an emergency communications center (ECC), an operations center, or a first responder. The emergency response assistant system may include a data retrieval system and an augmentation and generation system. The data retrieval system may be configured to transform emergency response procedures into vectors that are stored in a vector database. The augmentation and generation system may be configured to perform a vector search of the vector database with an AI model using context from call (e.g., a 911 call) characteristics and external data sources and may be configured to display the results on a user interface of an emergency management application to provide emergency response procedure suggestions to a user of an ECC computing system, an operations center computing system, or a first responder computing device.

21 Claims, 21 Drawing Sheets

(52) U.S. Cl.
CPC ........ *H04M 11/04* (2013.01); *H04M 2201/40* (2013.01); *H04M 2201/42* (2013.01)

(56) References Cited

U.S. PATENT DOCUMENTS

| | | |
|---|---|---|
| 12,074,999 B2 | 8/2024 | Martin |
| 12,219,082 B2 | 2/2025 | Martin |
| 2012/0218102 A1* | 8/2012 | Bivens ................ G08B 25/003 340/539.11 |
| 2014/0155018 A1* | 6/2014 | Fan ...................... H04W 72/51 455/404.1 |
| 2021/0352460 A1* | 11/2021 | Rohde ................... G06F 40/284 |
| 2023/0319180 A1* | 10/2023 | Manzanillo ....... G06F 16/90332 455/404.2 |

OTHER PUBLICATIONS

Microsoft Learn. Vectors in Azure AI Search. Available at https://learn.microsoft.com/en-us/azure/search/vector-search-overview. (8 pgs.) (Accessed Jun. 2024).

Microsoft Learn. What is Azure AI Document Intelligence. Available at https://learn.microsoft.com/en-us/azure/ai-services/document-intelligence/overview?view=doc-intel-4.0.0. (22 pgs.) (Accessed Jun. 2024).

National Emergency Number Association (NENA). The NENA Enhanced PSAP Registry and Census (EPRC) 2.0. Available at https://eprc-nena.hub.arcgis.com/pages/nena-eprc. (4 pgs.) (Accessed Jun. 2024).

\* cited by examiner

RapidSOS

Incident Queue 332

| Signal Source | Priority 334 | Type | Date/Time | Location | Disposition |
|---|---|---|---|---|---|
| AED Activation | HIGH | Medical | 3/25/24 13:14:27 | Building 2, Floor 29 | IN PROGRESS |
| 911 Call from Inside Building | HIGH | Medical | 3/25/24 13:14:29 | Building 2, Floor 29 | IN PROGRESS |
| Kitchen Fire Alarm | NORMAL | Fire | 3/25/24 13:08:52 | Building 3, Floor 2 | NEW |
| Bathroom Smoke Alarm | LOW | Fire | 3/25/24 13:11:35 | Building 1, Floor 15 | RESOLVED |

Insight Assistant: it appears that someone experienced a heart related issue in Building 2. ← 344

342

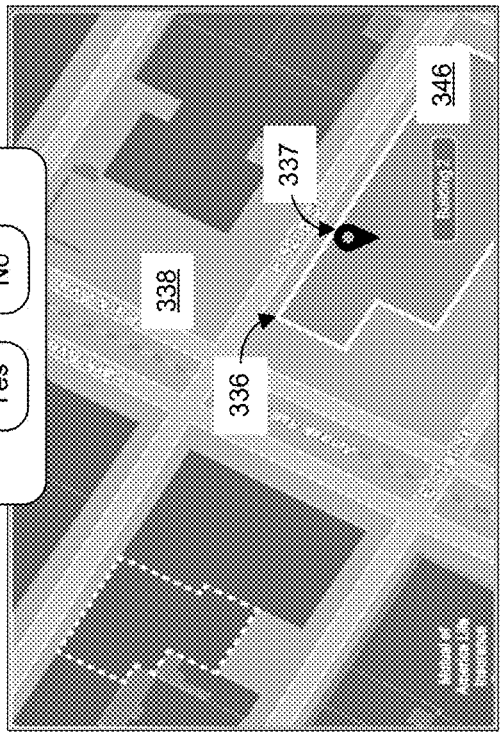

340

Enterprise Building #2

Address:
72 Avenue B Unit 22
Sunnyvale, California 94087

Security Cameras
- 280 cameras online

Fire Panel
- 327 Sprinkler systems online
- 526 Manually actuated fire alarms
- 618 Smoke detectors Floors  45
Active Sensors  987
Employees On-site  1,372

Smart Devices
- 92 AEDs online
- 1 AED Activated
- 57 Other smart devices online 348 → Dispatch security to open the door for EMS?  Yes  No — 338

METHODS AND SYSTEMS FOR AN EMERGENCY RESPONSE DIGITAL ASSISTANT

RELATED APPLICATION

This application claims priority to U.S. Provisional Application No. 63/648,475, filed May 16, 2024, and further claims priority to U.S. Provisional Application No. 63/679,100, filed Aug. 3, 2024, each of which are hereby incorporated by reference in their entirety.

TECHNICAL FIELD

This disclosure relates generally to emergency management systems, and in particular to providing real-time suggestions to emergency management and response personnel.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIGS. 3A, 3B, and 3C illustrate example diagrams of user interfaces for an operations center emergency management application, in accordance with embodiments of the disclosure.

DETAILED DESCRIPTION

Figure 1A:
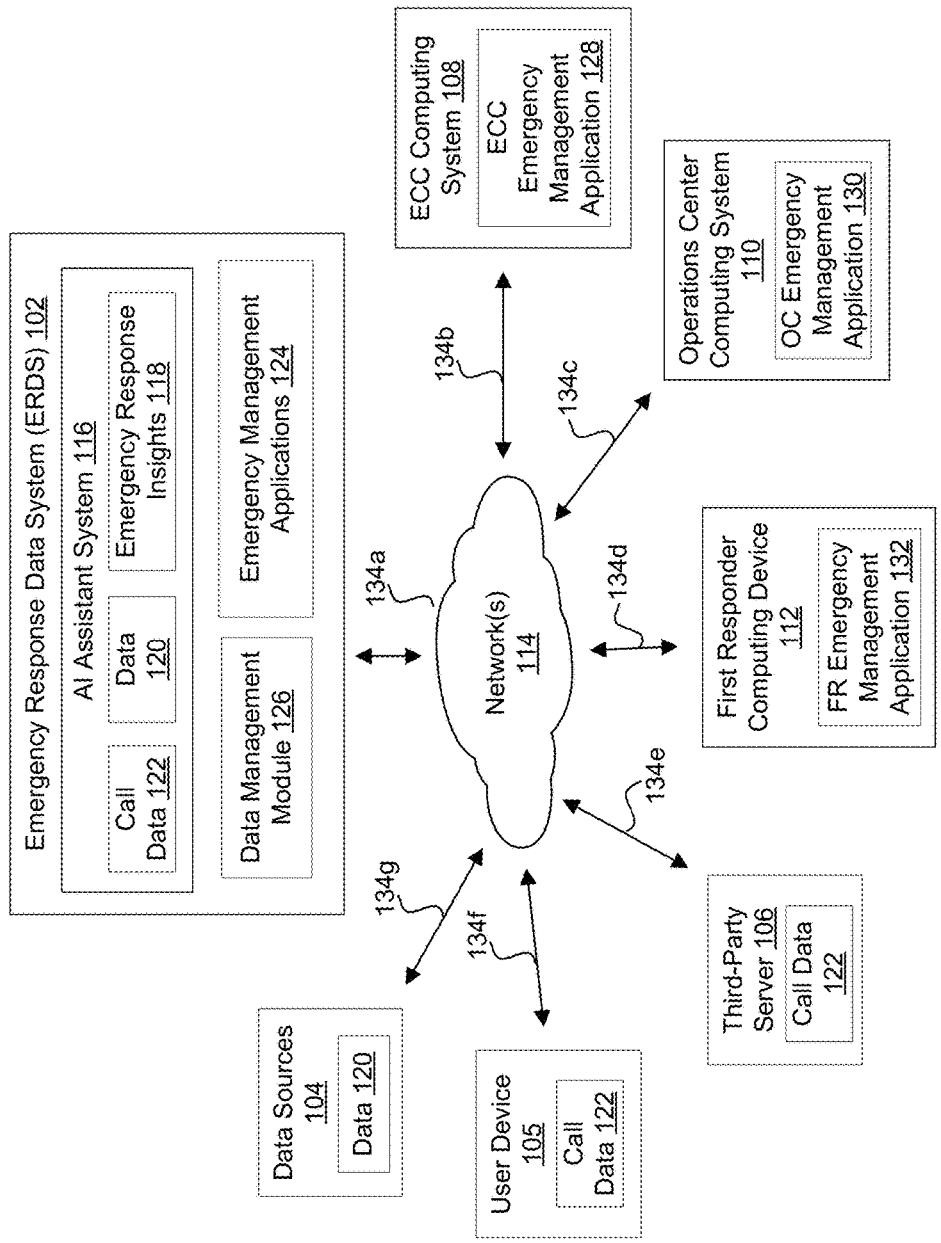
FIGS. 1A and 1B illustrate example diagrams of an emergency response digital assistant system, in accordance with embodiments of the disclosure.

Various aspects of the disclosure include methods and systems for an emergency response digital assistant. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

A public emergency services agency may be established to provide a variety of services. A public emergency services agency can include a 911 call center, a railway network operations center (NOC), a primary call center, a secondary call center (e.g., that receives calls from or routes calls to a primary call center), and the like. A public emergency services agency may be referred to as an emergency service provider (ESP) or an emergency communications center (ECC). One type of ESP or ECC is a public safety answering point (PSAP). A PSAP is another name for a 911 call center that receives emergency calls and dispatches emergency (first) responders in response to the emergency (e.g., 911) calls.

As used herein, a first responder may refer to a firefighter, an emergency medical technician, a paramedic, a police officer, a peace officer, an emergency medical dispatcher, a search and rescue team member, a hazardous materials (HazMat) responder, volunteer emergency workers, and/or public health officials. The systems, processes, and overall technologies disclosed herein may be applicable or implemented for one or more of the various types of first responders, despite some specific examples being directed to firefighters and/or medical service providers for illustrative purposes.

An emergency may be identified from a variety of sources, such as a phone call, a video feed, an image, a smoke sensor/alarm, an accelerometer, an airbag sensor, a medical device, a smart home hub, a fire control panel, or the like. Unfortunately, the sources of information that could be used to identify and initiate a response to an emergency are disconnected and dissociated from one another—this is a technical problem that plagues the emergency response industry. For example, present day emergency systems do not associate 911 calls with activated smoke alarms, even if the calls are made within close proximity to a building having multiple floors of activated smoke alarms. Instead, each call is received in isolation, the smoke alarms are monitored by a building manager (at best), and a correlation is drawn between calls and sensor data in hindsight. Such disconnect paints an incomplete picture of emergency data sources, leads to delays in the communication of crucial information to first responders, and underscores the need for advancements in emergency identification and assessment.

Embodiments of the present disclosure include methods and systems that integrate smart device (e.g., Internet of Things) data with an emergency response data management system to leverage AI and machine learning to improve emergency response. This AI-powered system/platform combines smart device detection sensors with emergency response data to detect temporal anomalies to identify and escalate emergencies quickly and accurately, according to embodiments. The disclosed methods and systems also integrate with 911 dispatch systems using generative AI to streamline emergency communication and resource allocation, for example. Embodiments of the disclosure utilize federated learning as an innovative and strategic methodology that is intrinsically structured to safeguard privacy and enable decentralized computation. The Inventors of the disclosure estimate a potential reduction in detection and 911 dispatch times by up to 90%, which may significantly reducing responder arrival times, reduce property damage, and reduce loss of life.

Embodiments of the disclosure include systems and methods for an emergency response digital assistant that aggregates multiple sources of emergency data, analyzes the aggregated data, and generates emergency response insights that may be provided to an ECC, and operations center, and/or to first responders. Notably, the emergency response digital assistant leverages artificial intelligence (AI) technology and techniques to perform near real-time analysis and insight generation. In some embodiments, the AI generated emergency response insights include, but are not limited to, suggestions for 911 protocols ("dispatcher determinant codes"), suggestions for actions (e.g., dispatch fire station #2 to an address), actions (e.g., automated emergency action plans), and notifications related to an incident (e.g., sensors detect that the fire has spread to the second floor).

The emergency response digital assistant may include AI technology that is implemented as a retrieval, augmentation, and generation (RAG) AI system, according to an embodiment. The RAG AI system receives and converts context-specific training materials (e.g., automotive manuals, appliance manuals, first aid procedures, poison control information, evacuation routes, API calls, PSAP SOPs, electric vehicle emergency protocols, response plans for specific buildings, floor plans, building staff schedules, incident response plans, etc.) into semantically correlated vectors stored in a vector database. The RAG AI system may be configured to aggregate and analyze characteristics of a triggering event (e.g., a 911 call, a sensor alarm, a query, etc.), one or more external data sources (e.g., sensor data, public record data, building data, telematics data, etc.), and the vector database content to generate emergency response insights (e.g., suggestions, actions, notifications, etc.). The emergency response insights may be provided to and displayed on an ECC emergency management system, an operations center emergency management system, and/or a first responder emergency management application, for example. Accordingly, the RAG AI system may be implemented in an emergency response digital assistant system that supports emergency response management for an ECC, an operations center (e.g., a GSOC, a rail NOC, etc.), and/or first responders.

In some embodiments, the AI assistant flow is triggered by receipt of a query, without call audio. For example, a query may be submitted by an ECC operator, may be submitted by a GSOC operator, may be submitted by a train NOC operator, and/or may be submitted by a first responder (e.g., with a first responder device), for example. The query may be used to prompt the RAG AI model to search a vector database, with or without a call or other data source, for example.

Embodiments of the disclosure provide a number of advantages over existing emergency response support technologies. For example, embodiments of the disclosure may lower the cognitive burden on an ECC operator, GSOC operator, or first responder to understand key, actionable information about an incident that may be coming in from multiple data streams at the same time. Embodiments of the disclosure provide a technical solution for the technical problem of communication delays between occurrence of an emergency until first responder arrive at the scene of an emergency. Embodiments of the disclosure may shorten the time it takes to communicate with key personnel about incident response, and embodiments of the disclosure may displace the need and reliance on Internet and social media searching during an incident by an ECC operator, GSOC operator, or first responder to glean more context about an emergency event. The disclosed systems and methods ingest a wide swath of data streams, refine searches with specific private documents (e.g., SOPs), and then actively surface relevant and specific pieces of information to the ECC operator, GSOC operator, and/or first responder.

The field of emergency response is crucial for public safety and well-being. First responders often encounter dynamic and complex situations that demand quick, informed decisions. Existing technologies have limitations in providing real-time, hands-free support. Advantageously, an AI-enabled virtual assistant can revolutionize the capabilities of first responders by providing real-time information, decision support, and situational awareness. Embodiments of the disclosed first responder emergency management application includes an AI-enabled virtual assistant that is configured to enhance the efficiency, safety, and effectiveness of first responders. The disclosed AI assistant system provides AI-enabled virtual assistance to leverage voice recognition, natural language processing, and data integration to provide real-time information, decision support, and communication capabilities, according to embodiments. The AI assistant system may enable two-way communication, data retrieval, language translation, and wearable device integration in a seamless, secure, and privacy-aware manner. Various embodiments of the disclosure are described hereafter and represented in FIGS. 1A-13.

Figure 1B:
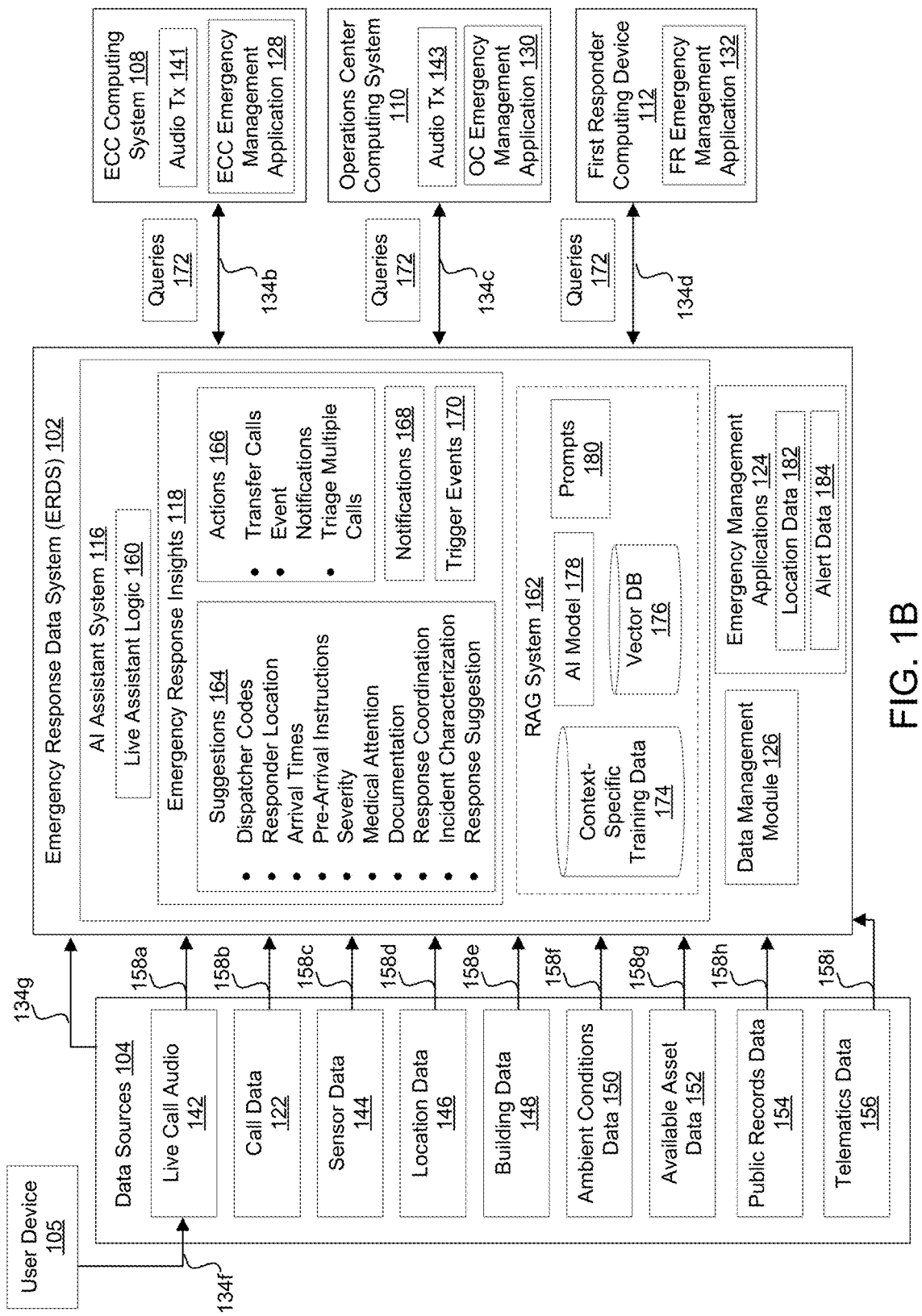

FIGS. 1A and 1B illustrate example embodiments of an emergency response digital assistant system that is configured to aggregate information from a number of data sources, analyze the information, and generate emergency response insights for emergency management personnel and emergency responders, in accordance with aspects of the disclosure. Currently, the latency inherent in human-operated detection and response protocols marks a critical bottleneck in mitigating emergency situations. FIG. 1A illustrates a diagram of an emergency response digital assistant system 100 that includes an emergency response data system (ERDS) 102 that is communicatively coupled to a number of data sources 104, a user device 105, a third-party server 106, an ECC computing system 108, an operations center (OC) computing system 110, and/or a first responder computing device 112 through one or more networks 114, according to an embodiment. Networks 114 may include a number of wired networks, wireless networks, network components, and infrastructure. A number of communications channels 134 (individually, 134a, 134b, 134c, 134d, 134e, 134f, and 134g) may communicatively couple the various components of emergency response digital assistant system 100.

Emergency response data system 102 includes an artificial intelligence (AI) assistant system 116 that is configured to generate emergency response insights 118 from data 120 and call data 122, according to an embodiment. AI assistant system 116 is operable to determine characteristics of call data 122 and aggregate the characteristics with data 120, according to an embodiment. AI assistant system 116 is operable to analyze the aggregated characteristics and data 120 to generate emergency response insights 118, according to an embodiment. AI assistant system 116 and/or emergency response data system 102 may then provide emergency response insights 118 to ECC computing system 108, operations center computing system 110, and/or first responder computing device 112 for receipt by emergency responders and/or emergency management personnel.

Emergency response data system 102 is configured to host and/or support a number of emergency management applications 124 that are accessed by and/or operated by ECC computing system 108, operations center computing system 110, and/or first responder computing device 112, according to embodiments. Emergency response data system 102 may be implemented with one or more servers that may be distributed across multiple data centers. Emergency management applications 124 may be implemented on/in emergency response data system 102 as web-based applications that are accessed via a web browser, a webhook, a persistent webhook, and/or one or more secure connections. Emergency management applications 124 may be configured to process and push (and receive) data to a mobile application or an operating system (OS) specific application that is downloaded to and operated by a particular computing system or device (e.g., a first responder smart phone). Data 120 and call data 122 may be retrieved, received, managed, and directed to AI assistant system 116 and emergency management applications 124 with a data management module 126 to support generating and delivering emergency response insights 118.

The various computing systems that receive emergency response insights 118 are tools that may be used by emergency response personnel and emergency responders to dispatch, communicate about, and respond to incidents and emergencies that are represented by or in data 120 and/or call data 122, according to an embodiment. ECC computing system 108 represents a computing system (e.g., a terminal, a server, a personal computer, a laptop, etc.) operated at or for an ECC. ECC computing system 108 is configured to operate or provide an ECC emergency management application 128. ECC emergency management application 128 may be communicatively coupled to emergency response data system 102 to receive emergency response insights 118, data 120, and/or call data 122. ECC emergency management application 128 may be configured with a graphical user interface to visually represent emergency events and incidents (e.g., using maps, queues, icons, data cards, etc.) and to enable emergency response personnel (e.g., 911 dispatchers, telecommunicators, etc.) to dispatch and communicate emergency events. Operations center computing system 110 represents a computing system (e.g., a terminal, a server, a personal computer, a laptop, etc.) operated at or for an operations center (e.g., a global operations security center (GSOC), a rail network operations center (NOC), etc.). Operations center computing system 110 is configured to operate or provide an operations center emergency management application 130. The operations center emergency management application 130 provides a graphical user interface to enable emergency response personnel (e.g., an operator, risk manager, security personnel, etc.) of corporations, other businesses, residences, academic institutions, and/or private entities to have awareness of incidents (e.g., emergency events) that occur on their particular premises or managed premises. First responder computing device 112 is representative of computing systems, mobile devices, and/or in-vehicle devices used by emergency responders to navigate to, coordinate for, and communicate about emergency events and other incidents, according to an embodiment. First responder emergency management application 132 may be operated on or by first responder computing device 112. First responder emergency management application 132 is communicatively coupled to emergency response data system 102 to receive emergency response insights 118, data 120, and/or call data 122 to inform the preparation and response to emergency events, according to an embodiment.

User device 105 may include a telephone, a smart phone, tablet, a laptop, personal computer, a chrome book, or other computing devices that may be used, to initiate an emergency call (e.g., a 911 call) or to otherwise report an incident, according to an embodiment. Call data 122 represents audio data, video, data, images, multimedia messages, and/or text messages provided from user device 105 to ECC computing system 108 and/or operations center computing system 110, according to an embodiment. Third-party server 106 may include a telecommunications or device manufacturer server that receives location data, user identification data, and/or call statistics for emergency calls made by user device 105. Third-party server 106 may be configured to provide call data 122 to emergency response data system 102 to support operation of emergency applications 124, according to an embodiment.

FIG. 1B illustrates an example block diagram of an emergency response digital assistant system 140 and is representative of an example implementation of emergency response digital assistant system 100, in accordance with aspects of the disclosure.

Data sources 104 may include one or more of a number of data types and data sources that may be used to identify, characterize, analyze or otherwise gain insights about emergency events and other incidents, according to an embodiment. Examples of data sources 104 include, but are not limited to, live call audio 142, call data 122, sensor data 144, location data 146, building data 148, ambient conditions data 150, available asset data 152, public records data 154, and telematics data 156, according to an embodiment. Live call audio 142 may be received by emergency response data system 102 by configuring a call audio transmitter 141 to forward/provide live call audio 142 from ECC call handling equipment (e.g., from ECC computing system 108) and/or by configuring call audio transmitter 143 to forward/provide live call audio 142 from GSOC/NOC call handling equipment (e.g., from operations center computing system 110), for example. Live call audio 142 may also include transcripts of radio-based dispatches of emergencies from an ECC. Call data 122 may include call duration, caller name, repeat call statistics, etc. of a call to an ECC or operations center. Sensor data 144 may include, but is not limited to, data received or retrieved from residential buildings, commercial buildings, personal medical devices, personal safety devices, industrial structures, vehicles, crash detectors, smoke alarms, fire alarms, smart cameras, home security devices, moisture detectors, motion detectors, shock detectors, location sensors, gas detectors, pressure sensors, or the like, according to various embodiments of the disclosure. Location data 146 may include a location of a sensor or incident. Building data 148 may include construction materials, structure age, floorplans, renovation history, electrical schematics, HVAC layout, or the like. Ambient conditions data 150 may include weather data, weather forecasts, road conditions, wind speeds, visibility, cloud conditions, temperature, or the like. Available asset data 152 may include, but is not limited to, a number of available drones, a number of available medical devices (e.g., automated external defibrillator), a number of vehicles, a number of sprinklers in a building, or the like. Public records data 154 may include, but are not limited to, personal property records, arrest records, residential addresses, etc. Telematics data 156 may include various types of vehicle data, such as accelerometer data, gyroscope data, air bag sensors, vehicle log data, or the like. Additional miscellaneous data source or data types may include social media feeds, new feeds, geofence data, traffic feeds, visual impairment status, auditory impairment status, or the like. The various data sources 104 may be communicatively coupled to emergency response data system 102 through a number of communications channels 158 (individually, 158a, 158b, 158c, 158d, 158e, 158f, 158g, 158h, and 158i), according to embodiments of the disclosure.

AI assistant system 116 may include a number of components to support generating emergency response insights 118 for display by one or more of ECC emergency management application 128, operations center emergency management application 130, and/or first responder emergency management application 132, according to an embodiment. AI assistant system 116 may include live assistant logic 160 and retrieval, augmentation, generation (RAG) system 162 to generate emergency response insights 118 based on call data 122, data sources 104, and trigger events 170, according to an embodiment.

Emergency response insights 118 may include suggestions 164, actions 166, and/or notifications 168 that are generated in response to one or more trigger events 170, according to an embodiment. Suggestions 164 may be displayed or transmitted to emergency applications 124 to provide summaries, suggested actions, additional awareness, or other insights to a dispatcher, telecommunicator, emergency management operator, or first responder, according to an embodiment. Suggestions 164 may include, but are not limited to, 911 dispatcher codes, responder location, arrival times, pre-arrival instructions for first responders, severity of an incident, live updates to incidents (based on live audio analysis and/or sensor data), medical procedures, documentation (e.g., standard operating procedures), response coordination, incident, characterization, and/or response suggestions, in accordance with various embodiments of the disclosure. Emergency response data system 102 may cause one or more suggestions 164 to be displayed on a user interface of ECC emergency management application 128, operations center emergency management application 130, and/or first responder emergency management application 132, according to an embodiment.

Actions 166 are examples of actions that AI assistant system 116 may, in coordination with emergency response data system 102, initiate to facilitate a response to an emergency event. Actions 166 may include, but are not limited to, transfer calls (e.g., to an ECC having jurisdictional authority for a call), triage multiple calls (e.g., group, associate, combine, or summarize), call a point of contact (e.g., at a business location of an incident), search for a phone number of a point of contact, and/or generate a group chat or a group video conference between people who are located near or who are responding to a particular incident, according to various implementations of the disclosure.

Notifications 168 may include informational content or alerts derived from a combination of the trigger events 170, live call audio 142, or other data sources 104, in accordance with aspects of the disclosure. Notifications 168 may include displaying particular insights about one or more related incidents, information about changes to an incident (e.g. a change of location, nature of a fire, number of victims, etc.), available asset updates, or the like.

Trigger events 170 include events that may serve to initiate the aggregation of data sources 104, analysis of data sources 104, and/or the generation of emergency response insights 118, according to an embodiment. Examples of trigger events 170 may include, but are not limited to, a 911 call, a call to a rail NOC, a call to a GSOC, a text message to 911, a text message to a rail NOC, initiating a videoconference with 911, an activated alarm, a change in sensor data, a change in ambient condition data 150 (e.g., an abnormal increase or decrease in temperature or moisture in a space), receipt of a query 172 from ECC computing system 108, receipt of a query 172 from an operations center computing system 110, or receipt of a query from first responder computing device 112, according to embodiments of the disclosure.

Live assistant logic 160 include instructions, scripts, and/or one or more processes that support operations of AI assistant system 116, according to an embodiment. For example, live assistant logic 160 may be configured to communicate with data management module 126 to receive data for processing. Live assistant logic 160 may be configured to provide generated emergency response insights 118 to emergency management applications 124, for example. Live assistant logic 160 may include or provide various application programming interfaces (API) to facilitate receipt of query 172, according to an embodiment. Live assistant logic 160 may include decision trees, flow diagrams, instructions, or other processes to support a live (real-time) interactions with human operators (e.g., dispatcher, telecommunicator, operations center operator, first responder, etc.), according to an embodiment. Live assistant logic 160 may be configured to at least partially perform one or more of processes 600, 700, 800, 900, 1000, and/or 1100 (e.g., shown in FIGS. 6-11), in accordance with aspects of the disclosure.

RAG system 162 is an architecture that is configured to support the retrieval, augmentation, and generation of emergency response data that is at least partially based on context specific training data 174, according to an embodiment. RAG system 162 includes context-specific training data 174, a vector database 176, an AI model 178, and prompts 180, according to an embodiment. Advantageously, RAG system 162 ingests a wide swath of publicly available information, is further refined with specific local or private (e.g., 911, GSOC-specific, etc.) protocols, and actively surfaces relevant and specific pieces of information to the call taker or first responder in real-time.

Context-specific training data 174 includes information that RAG system 162 and/or AI assistant system 116 can specifically analyze, retrieve, and/or regurgitate to generate emergency response insights 118 that are relevant to a particular emergency call or trigger events 170. Context-specific training data 174 can include standard operating procedures, images, historical transcripts, automotive manuals, appliance manuals, first aid procedures, poison control information, evacuation routes, application programming interface (API) calls to sources like weather and traffic, and other manuals, for example. AI assistant system 116 is operable to retrieve and display specific relevant (e.g., semantically similar) portions of context-specific training data 174 for integration into emergency response insights 118 and/or for display by ECC computing system 108, operations center computing system 110, and/or first responder computing device 112, according to an embodiment.

Context-specific training data 174 includes dispatcher determinant code definitions used by AI model 178 to determine a particular emergency protocol number based on characteristics of the trigger events 170, live call audio 142, or other data sources 104, according to an embodiment. AI model 178 is configured to analyze vector database 176, trigger events 170, live call audio 142, and/or other data sources 104 to generate the dispatcher determinant code that can be displayed as an emergency response insight 118, according to an embodiment. The dispatcher determinant code definitions may align with the Medical Priority Dispatch System (MPDS) definitions or another codification of emergencies. The dispatcher determinant codes may include three components: a chief complaint number, a priority level, and a suffix that indicates specific conditions or additional information. The determinant codes may include: a chief complaint number (ranging from 1 to 33 in the MPDS); a priority level (Alpha, Bravo, Charlie, Delta, Echo); and a suffixed letter or special indicators that apply to special circumstances, e.g., "E" for Echo-level or "C" for cardiac arrest, for example. A few illustrative examples (of many possible definitions) of chief complaint numbers and their related codes in the MPDS may include, but are not limited to:

Abdominal Pain/Problems-Chief Complaint: 1
  Example Codes:
    1-A (Alpha-level): Minor abdominal pain, non-life-threatening.
    1-D (Delta-level): Severe abdominal pain with life-threatening conditions.
Allergies (Reactions)/Stings-Chief Complaint: 2
  Example Codes:
    2-B (Bravo-level): Allergic reaction without respiratory distress.
    2-D (Delta-level): Anaphylaxis or severe reaction, life-threatening.
Animal Bites/Attacks-Chief Complaint: 3
  Example Codes:
    3-A (Alpha-level): Minor animal bite, stable.
    3-D (Delta-level): Severe injuries from an animal attack.
Assault/Sexual Assault-Chief Complaint: 4
  Example Codes:
    4-B (Bravo-level): Non-life-threatening injuries.
    4-D (Delta-level): Serious traumatic injury.

Examples of priority levels may include, but are not limited to:
  Alpha (A): Low priority, typically no lights and sirens required.
  Bravo (B): Moderate priority, lights and sirens may be used.
  Charlie (C): High priority, lights and sirens.
  Delta (D): Highest priority, full emergency response.
  Echo (E): Life-threatening, requiring immediate resuscitation (cardiac arrest).

Commonly used suffix letters may include, but are not limited to:
  E: Echo-level (typically indicates life-threatening conditions, such as cardiac or respiratory arrest).
  C: Critical condition such as cardiac arrest.
  X: Used in some systems to designate certain circumstances or injuries.

Vector database 176 is operable to store vectors that are numerical representations of the semantics of context-specific training data 174. Vector database 176 is populated using document intelligence tools, a transformer, and/or a large language model (LLM) that at least partially analyzes and conditions context-specific training data 174 into a searchable format. AI model 178 may be configured to operate as a transformer for populating vector database 176. Vector database 176 may include a number of fields for the vector index, such as, tokens, emergency type, content, ECC name, operations center name, first responder station. Vector database 176 may include a pre-defined search dimension (e.g., 1536 dimensions) based on the embeddings model used, for example. Additional embodiments related to conditioning data for vector database 176 are described in relation to FIG. 5.

AI model 178 may be implemented using one or more of a variety of technologies. AI model 178 may be a service that emergency response data system 102 communicates with remotely or may include a number of libraries and software packages installed onto one or more local or distributed server (e.g., cloud) systems. AI model 178 may be implemented using transfer learning models that apply knowledge learned from one task to another, typically using pre-trained models. Examples of transfer learning models that may be used include, but are not limited to, BERT (bidirectional encoder representations from transformers): a transformer-based model for natural language processing tasks; GPT (generative pretrained transformer): a generative model for text-based tasks; and ResNet: a pre-trained deep learning model commonly used for image classification. AI model 178 may incorporate other types of models, such as deep learning models, unsupervised models, generative models, recommender systems, or the like. Examples of deep learning models may include convolutional neural networks (CNN), which may be used for image recognition tasks; recurrent neural networks (RNN), which may be used for sequential data, such as time series or natural language; and long short-term memory networks (LSTMN), for example.

AI model 178 may be implemented using one or more large language models (LLMs), according to an embodiment. LLMs are AI models that are trained to understand and generate human language. LLMs use large amounts of text data to learn patterns, context, and meaning in language. Examples of LLMs include, but are not limited to, generative pretrained transformers (GPTs), BERT, DistilBERT, T5 (Text-to-Text Transfer Transformer), XLNet, Turing-NLG, LLaMA (Large Language Model Meta AI), Claude, PaLM (Pathways Language Model), Megatron-Turing NLG, ChatGPT, OpenAI Codex, ERNIE (Enhanced Representation through Knowledge Integration), and/or Grok.

AI model 178 may be configured to aggregate and analyze information to generate insights that are responsive to trigger events 170, according to an embodiment. AI model 178 may be configured to aggregate and analyze characteristics of live call audio 142 by analyzing and/or transcribing and analyzing live call audio 142 that is received, for example, with audio transmitter 141 or 143. AI model 178 may be configured to analyze characteristics of live call audio 142 with data sources 104 and information from trigger events 170 as context for generating emergency response insights 118. AI model 178 may be configured to (or prompts 180 may instruct AI model 178 to) search vector database 176 for context-specific information.

AI model 178 may be configured to operate at different risk tolerance levels or temperatures. For example, under a low temperature setting, AI model 178 may generate conservative results that are more verbatim and grounded in the information loaded into the vector database. Additionally, under a high or higher temperature setting, AI model 178 may generate creative results that may be less verbatim and may be based on information that is external to the information loaded into the vector database, for example.

Prompts 180 may be used to instruct AI model 178 to operate differently for different scenarios. Prompts 180 may be used to provide instructions to AI model 178 to cause AI model 178 to operate as, for example, a dispatcher, an operations center operator, and/or a first responder. Prompts 180 may include instructions related to: organizing key data points about an incident that can be pushed to relevant stakeholders; providing a telecommunicator with information they may not have readily available during an emergency call that may improve the chances of a successful response; pulling up snapshots of relevant information from long and complicated procedural documents used during emergency response; triggering specific warnings for the telecommunicator when the information deviates from the expected; aggregating extracted information and classifying the 911 call as "relevant" or "irrelevant" in order to deprioritize and divert non-emergency or duplicate calls to a non-emergency workflow; and/or preparing the telecommunicator with known information about a caller before the call even begins.

An illustrative example of a prompt to cause AI model 178 to operate as a dispatcher may include instructions similar to:

"You are an AI Assistant whose task is to analyze a 911 call and its associated metadata and assist the 911 dispatcher with their job. In order to ensure we are capturing the 911 caller's spoken word correctly, we have provided you with transcriptions of the same call using two different speech-to-text services. You should read between the lines, use judgement and/or context clues about the scenario (outlined by the transcriptions AND any accompanying data) to make up for any deficiencies in one speech-to-text service's transcription or the other. The way in which you help the 911 dispatcher with their job is by accomplishing 3 distinct tasks:

1) Propose 1-3 of the following:
   pertinent questions that 911 dispatcher could ask the caller to uncover information about the scenario at-hand,
   pertinent snippet of informative advice grounded in guidance within the provided relevant Documentation or Standard Operating Procedures,
   a recitation of any pertinent information in the additional datasets that could've been overlooked.

2) Provide a Boolean classification of whether placeholders (such as '<insert_address_here>') in the scenario template(s) should be updated given information in the latest chunk of the 911 call transcription.

3) List any APIs that will need to be used to curate additional external data necessary for observation in order to give holistic guidance/advice/propose questions about the scenario at-hand (as outlined in the guidelines of (1) above). The complete list of available external data sources is as follows: ['real_time_weather_api', 'weather_timeframe_api']."

The prompt may or may not include additional rules and may be extended with additional prompt language, such as:

Since you are assisting a 911 dispatcher, it is imperative that you know when you should propose questions or supply advice and when you should stay quiet. If the call has not progressed far enough to ascertain clear advice, simply list 1 question. On the other hand, if the call has progressed further and there is detailed guidance in the SOP's, you may provide 3 snippets of advice or guidance.

Ensure that your snippet(s) of guidance or advice (if any) is/are grounded in the provided Documentation or Standard Operating Procedures.

Your questions can be founded in the provided Documentation or Standard Operating Procedures as well."

Emergency applications 124 may provide location data 182 and alert data 184, in addition to emergency response insights 118, according to an embodiment. Location data 182 may include a device-based location of an emergency event. The device-based location may be derived from call data 122 and/or may be received from third-party server 106. The device-based location may be based on GPS location of user device 105 or based on registered locations of electronic devices in the vicinity of user device 105, according to various embodiments. Alert data 184 may include alerts or notifications that is based on sensor data 144 or one or more additional data sources 104, according to an embodiment. Location data 182 and/or alert data 184 may be provided to or displayed by one or more of the emergency management applications 128, 130, and/or 132, according to various embodiments.

Emergency response data system 102 and AI assistant system 116 may be configured to be responsive to queries 172 that may be entered into and received through any one of emergency management applications 128, 130, and/or 132. Emergency response data system 102 and AI assistant system 116 are configured to be responsive to queries 172 in the absence of a call-based trigger and/or a data-based trigger, according to an embodiment. Emergency management applications 128, 130, and/or 132 may include a query input text box, may perform audio to text, or may receive and transmit audio to provide queries 172 to AI assistant system 116. AI assistant system 116 may use queries 172 as a trigger event 170. AI assistant system 116 may convert queries 172 into a semantic vector (e.g., using AI model 178) to perform a vector search of vector database 176, a content search of vector database 176, and/or a hybrid vector-content search of vector database 176. AI assistant system 116 may provide responses to queries 172 as emergency response insights 118 and using similar UI elements in graphical user interfaces of emergency management applications 128, 130, and/or 132.

Various embodiments of the disclosure reference vector searches. It is to be understood, that the disclosed methods and systems may be configured to perform a hybrid search with a text-based search of the emergency response procedure data in addition to the vector search, in accordance with aspects of the disclosure.

FIGS. 2A, 2B, 2C, 2D, 2E, 3A, 3B, 3C, 4A, and 4B illustrate example user interfaces (UIs) and UI elements that may be used in a variety of implementations to provide real-time AI-based assistance and insights to ECCs, operations centers, and first responders, in accordance with various embodiments of the disclosure. Any UI element shown in one of FIGS. 2A, 2B, 2C, 2D, 2E, 3A, 3B, 3C, 4A, and 4B may be applied to one or more other FIGS. 2A, 2B, 2C, 2D, 2E, 3A, 3B, 3C, 4A, and 4B in the disclosure to make additional embodiments that are contemplated as being within the scope of the present disclosure.

Figure 2A:
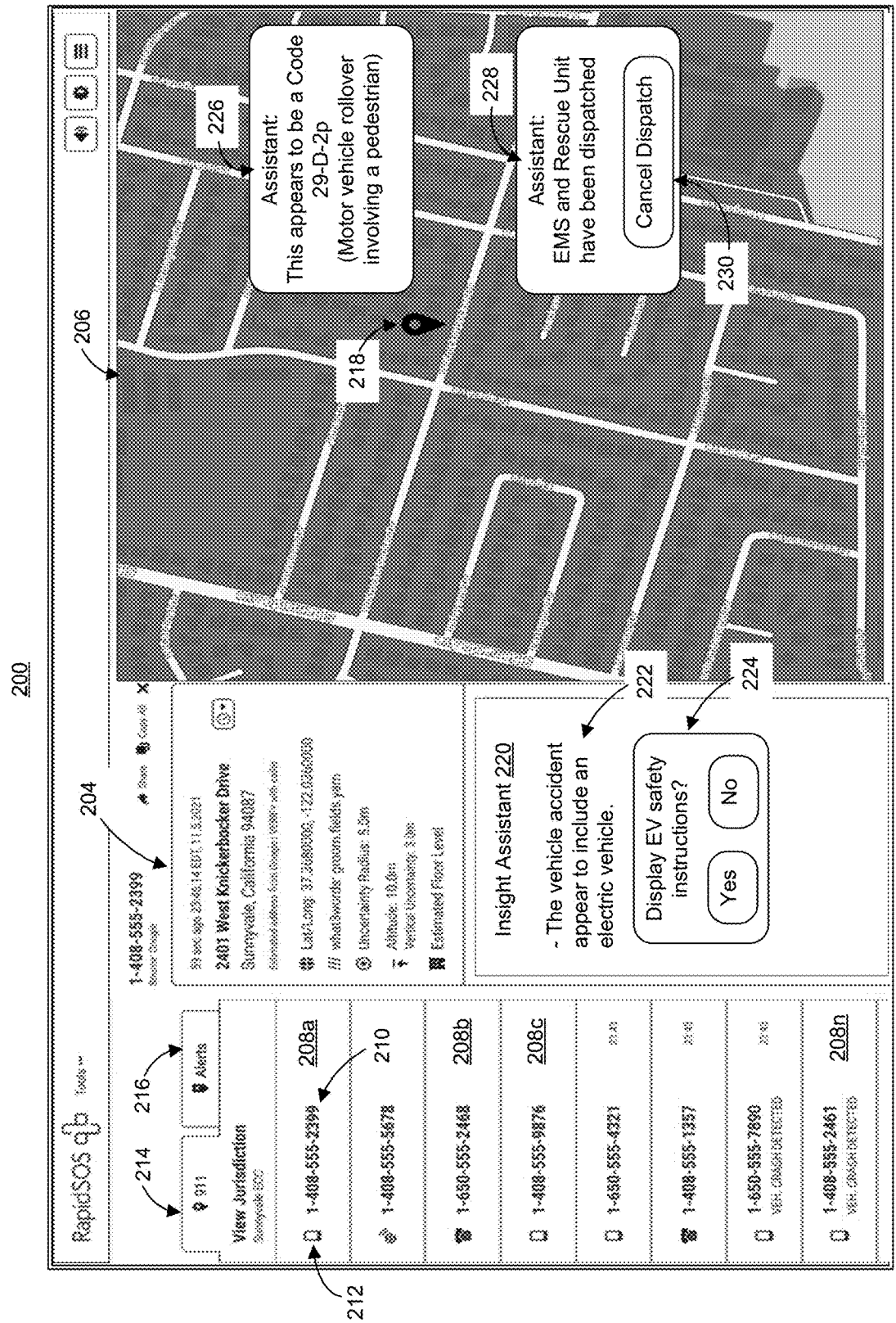
FIGS. 2A, 2B, 2C, 2D, and 2E illustrate example diagrams of user interfaces for an emergency communications center (ECC) emergency management application, in accordance with aspects of the disclosure.

FIGS. 2A, 2B, 2C, 2D, and 2E illustrate example diagrams of UIs for ECC emergency management applications that are example implementations of ECC emergency management application 128 that may be operated by an ECC computing system (e.g., ECC computing system 108), in accordance with aspects of the disclosure. FIG. 2A illustrates a diagram of a UI 200 for an ECC emergency management application that displays/includes emergency response insights that may be provided by an AI assistant system (e.g., AI assistant system 116, shown in FIGS. 1A and 1B), according to an embodiment. UI 200 includes an incident queue 202, a data card 204, and a map 206. Incident queue 202 includes a number of individual incidents 208 (individually 208a, 208b, 208c, . . . 208n) that are representative of requests for emergency services. Each incident 208 may represent a phone call, a text message (e.g., SMS, MMS, etc.), a video conference request made to, for example, 911 services, etc. Each incident 208 may be associated with a telephone number 210 and may be associated with an icon 212 that describes the source describes the mode of contact (e.g., cell phone, land line, Internet-based session, etc.). Incident queue 202 may include tabs to separate and organize different types of incidents that are received by an ECC emergency management application and that are displayed by UI 200. For example, a first tab 214 may be used to organize emergency requests that are initiated by user based on a phone call, text message, or a video conference request. A second tab 216 may be used to organize incidents 208 that are initiated based on sensor data (e.g., a smoke alarm, a proximity alarm, a home alarm system, etc.). The sensor data may be initially received by emergency response data system 102 (shown in FIG. 1B) and may be provided to an ECC through emergency applications 124 (shown in FIG. 1B), for example.

Data card 204 provides detailed information for a particular or selected incident 208. Data card 204 may include an address, latitude and longitude coordinates, information about a caller, the name and contact information for a point of contact, the type of sensor or alarm that triggered an incident, the name of the sensor manufacturer, etc.

Map 206 may graphically display a location 218 of one or more of the incidents 208 (or senor data alerts) displayed in incident queue 202. Location 218 may be indicated on map 206 with a number of different types of icons. For example, an icon can include a pin drop or can include a graphical representation of the nature of the incident. For example, a fire icon may represent a fire-related incident, a Red Cross symbol may represent a medical-related incident, a vehicle icon may represent a vehicular accident, a camera icon may represent an incident that was identified through video analysis, or the like. A dispatcher, telecommunicator, or other operator of an ECC computing system may use UI 200 to dispatch first responders or emergency responders to location 218 of incident 208. UI 200 includes various information that enables and supports an operator to convey helpful information to the first responders.

UI 200 displays various examples of emergency response insights that may be provided to and displayed on an ECC emergency management application, in accordance with aspects of the disclosure. The emergency response insights are illustrative example implementations of emergency response insights 118 (shown in FIG. 1B). For example, UI 200 may include an insight assistant window 220, and insight assistant window 220 may provide a notification 222 that a vehicle accident may include an electric vehicle. The AI assistant system may extract the emergency response insight of notification 222 from telematics data (e.g., identifying an electric vehicle and crash) received from one or more data sources and may correlate the location of the telematics data with the location of an incident to generate notification 222. Insight assistant window 220 may provide a prompt 224 to suggest an action 224, such as to display electric vehicle safety instructions that the AI assistant system may extract using the RAG system (e.g., RAG system 162 shown in FIG. 1B).

UI 200 displays a suggestion 226, as an example of an emergency response insight. Suggestion 226 suggests a particular dispatch code (e.g., code 29-D-2p) that is used to characterize a particular (e.g., a selected) incident. The dispatch code may be identified as a result of a vector search or hybrid content-vector search of a database that is trained on emergency response procedure data, according to an embodiment.

UI 200 may also include an action notification 228 that indicates an automated dispatch action performed by the AI assistant system. The action notification 228 is an example of an action that the AI assistant system may take, and action notification 228 may include that EMS and a rescue unit have been dispatched. The action taken may be defined by emergency response procedures that have been uploaded to a (vector) database as a dispatcher action to take in response to a particular dispatch code (e.g., code 29-D-2p). UI 200 displays the UI element 230 (e.g., a button) that enables an operator to stop, cancel, or undo a particular action that was initiated by the AI assistant system, according to an embodiment.

Figure 2B:
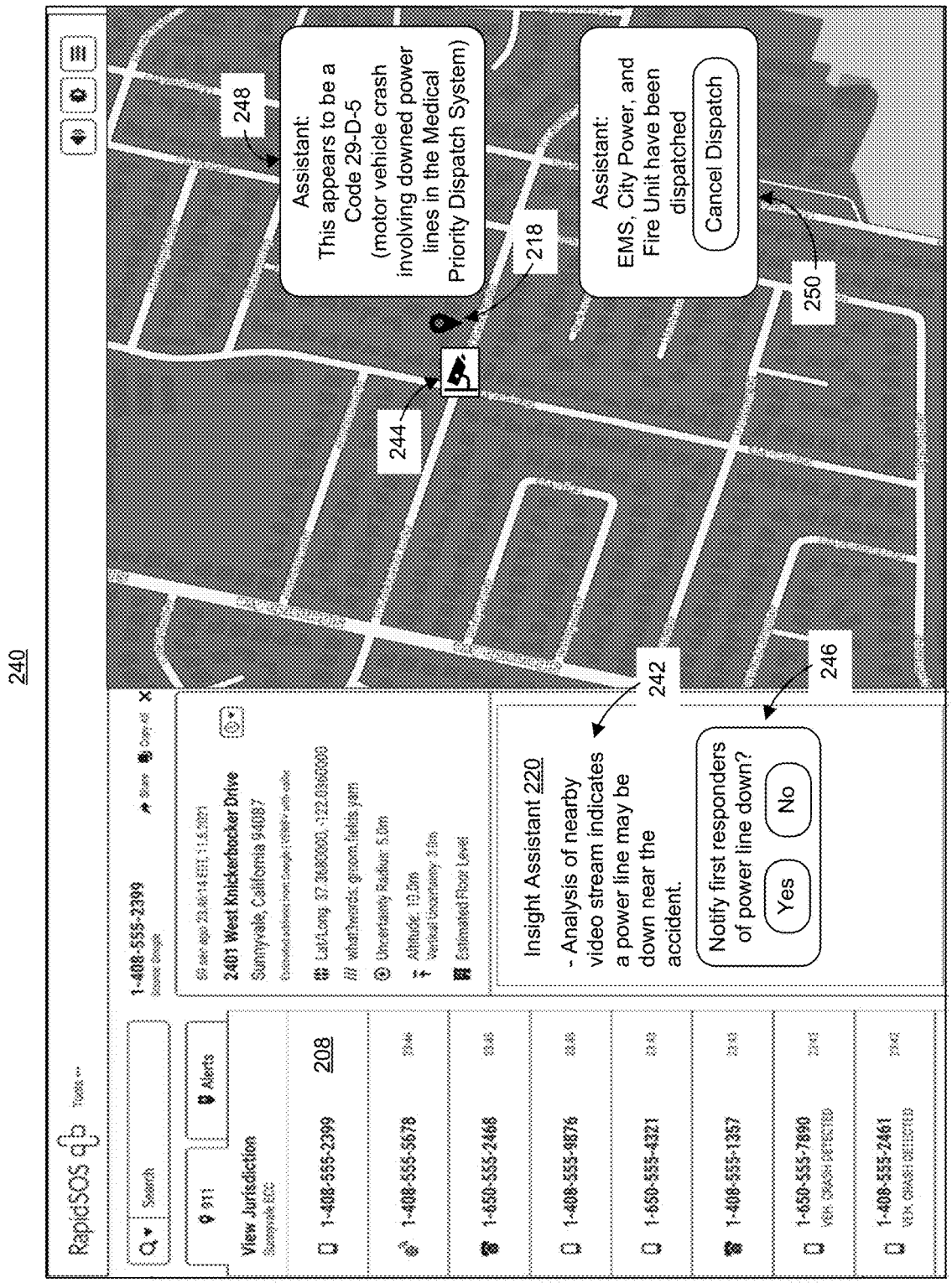

FIG. 2B illustrates an example diagram of a UI 240 that displays emergency response insights that are based on the aggregation of one or more data sources with context-specific training data that is maintained by, for example, a RAG system, according to an embodiment. UI 240 includes an emergency response insight 242 that includes a notification that a powerline may be down near the location 218 of an incident. The AI assistant system may analyze live call audio from incident 208 and/or may analyze telematics data to determine that incident 208 corresponds with an electric vehicle accident. Emergency response data system (e.g., emergency response data system 102, shown in FIG. 1B) may retrieve or receive video data from image data from an image sensor 244 (e.g., a camera), and the AI assistant system may analyze the image data to determine that a powerline is down. AI assistant system may prompt the operator with an action 246 to notify first responders of a powerline being down. Upon receipt of affirmation from an operator, AI assistant system may be configured to determine which first responders to notify, may locate contact information for the relevant first responders, and may transmit electronic notification (e.g., email, text message, SMS, MMS, CAD-based notification, etc.) to one or more first responders. The AI assistant system may also update UI 240 with a notification 248 of a dispatcher determinate code ("dispatch code") that may be more relevant based on the additional (e.g., image analysis) information available. AI assistant system may also use UI 240 to display an action 250 that is been performed (e.g., contact city power) based on an image-related data source that is located near location 218 of incident 208.

Figure 2C:
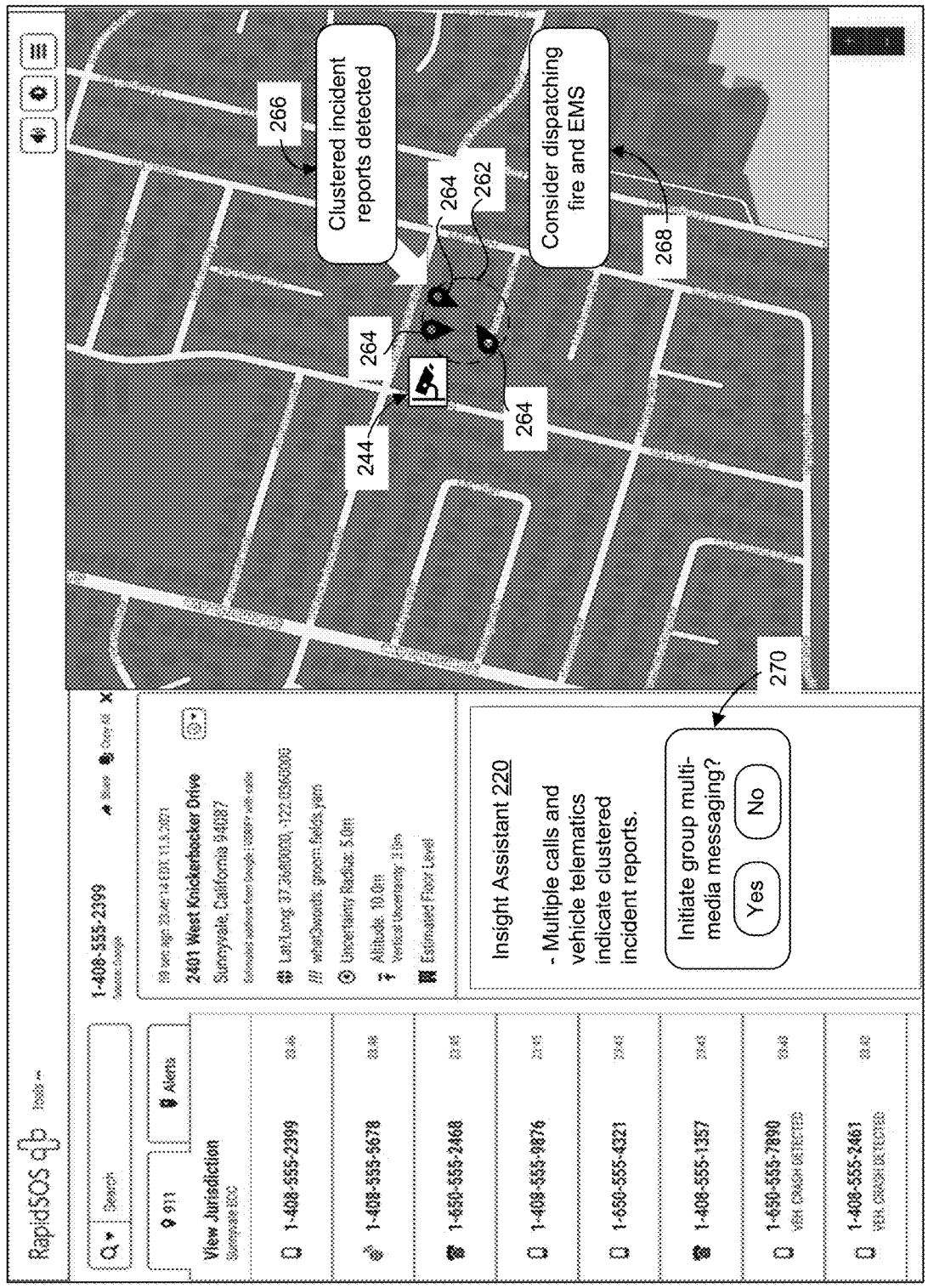

FIG. 2C illustrates an example diagram of a UI 260 to provide emergency response insights related to clustered or aggregated incident reports, according to an embodiment. Based on a cluster 262 of incidents 264 that are located temporally and/or spatially proximate to each other, AI assistant system may provide notifications and suggest a particular set of actions, according to an embodiment. For example, AI assistant system may display a notification 266 on UI 260 to notify the operator that clustered incident reports have been detected. AI assistant system may provide a suggestion 268 that the operator perform a particular action (e.g., dispatch multiple types of emergency services) within insight assistant window 220. AI assistant system may suggest a communication action 270, such as initiating a group multi-media message, a group call, or a group video session to enable the operator to efficiently obtain incident information from a number of people and to concurrently communicate status updates to various concerned parties. AI assistant system may generate the emergency response insights illustrated in UI 260 based on an analysis of live call audio, analysis of call data, analysis of telematics data, and analysis of location data, for example.

Figure 2D:
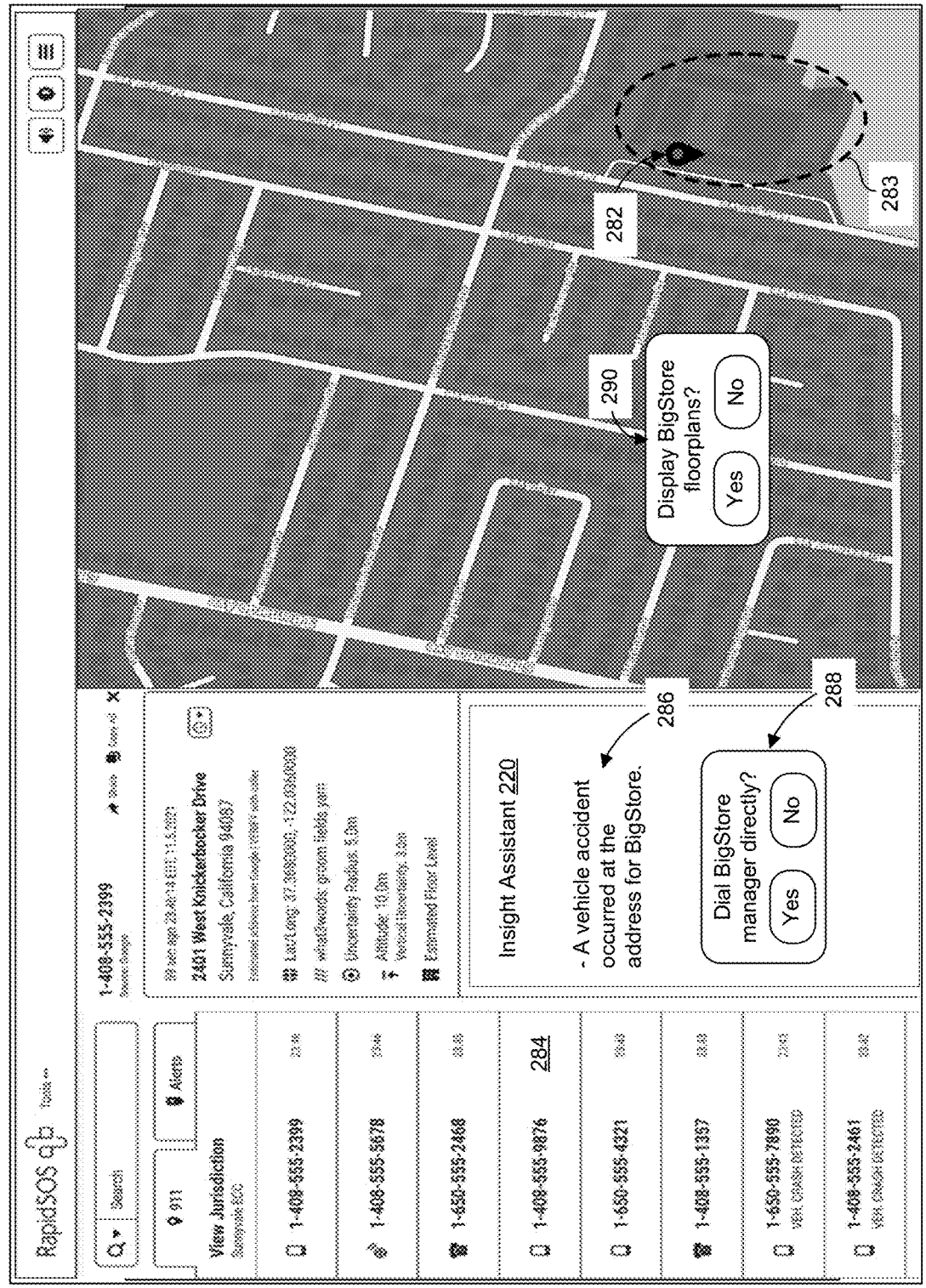

FIG. 2D illustrates an example diagram of a UI 280 that illustrates example emergency response insights that may be based on a data exchange with an operations center (e.g., a global security operations center (GSOC)), according to an embodiment. UI 280 may display a location 282 for an incident 284 that is related to a vehicle accident at a commercial location 283 of BigStore, as an example. The AI assistant system may determine that a vehicle accident occurred by aggregating and analyzing live call audio (e.g., to an ECC), location data for the source of the emergency call, telematics data, and GIS data that co-locates the commercial location 283 of BigStore with location 282 of the vehicle accident. AI assistant system may use UI 280 and insight assistant window 220 to provide a notification 286 of vehicle accident at BigStore and may suggest an action 288 that the AI assistant system dial the manager for BigStore, according to an embodiment. The AI assistant system may use UI 280 to suggest additional action 290 that includes displaying BigStore floor plans. AI assistant system, emergency response data system, and/or a vector database of the rack architecture may include BigStore floor plans or may dynamically request floor plans from one or more computing systems of BigStore in response to detecting an incident that is co-located at the address for BigStore. In one embodiment, emergency response data system may provide a notification to an operations center computing system for BigStore to justify a request for floor plans from BigStore, which assists an ECC and first responders in responding to an incident that has occurred on the premises of BigStore. In exchange for a notification of an emergency incident on the premises of BigStore, the emergency response data system may request additional information (e.g., video feeds, sensor data, etc.) to facilitate the safe response to an emergency. In one embodiment, floor plans are a data source that may be requested, retrieved, or received after an initial incident has been identified at an address. In another embodiment, floor plans may be building data and part of context-specific training data that is used in a RAG system to support AI-based generation of emergency response insights, as illustrated in UI 280, according to an embodiment.

Figure 2E:
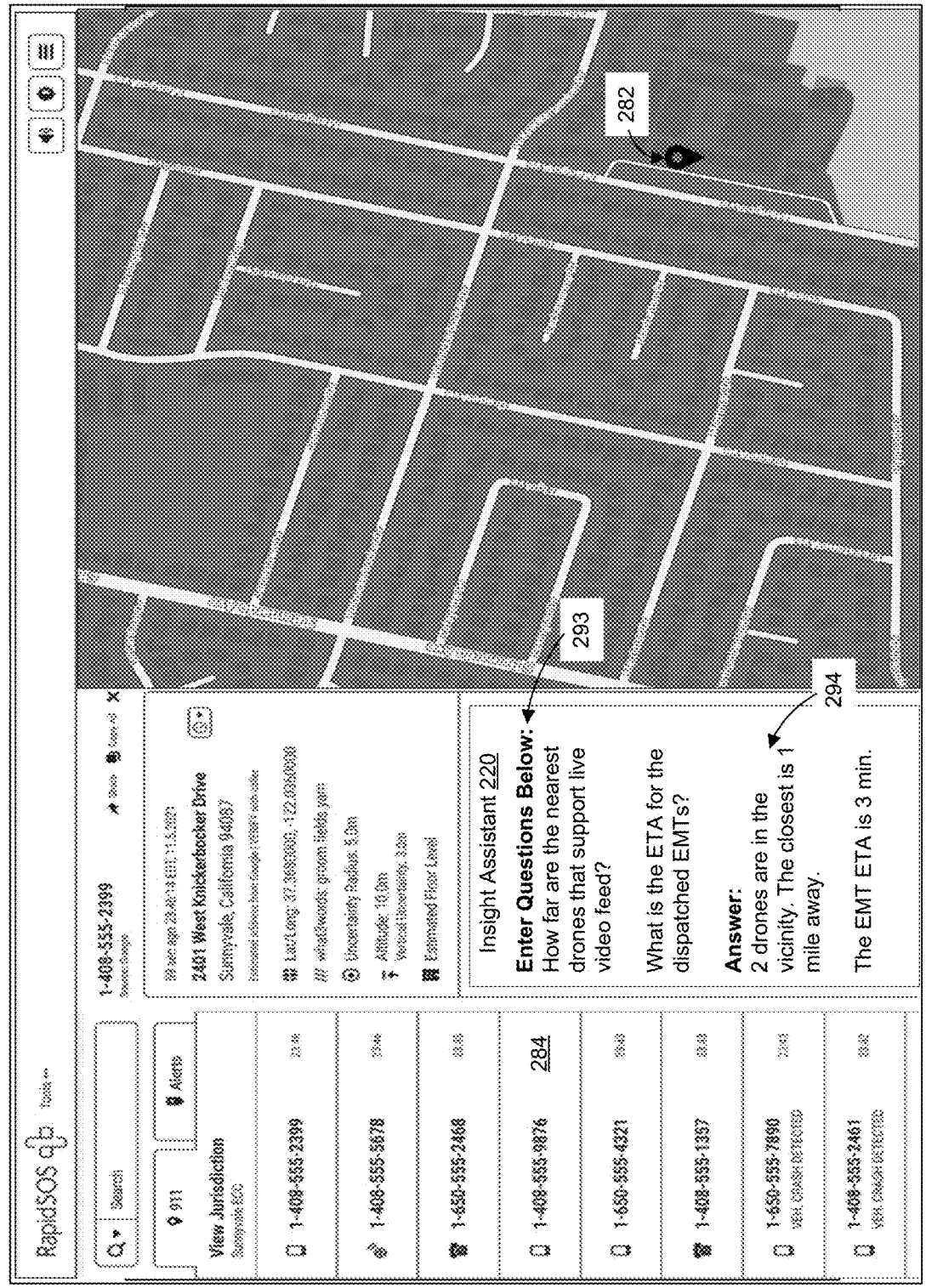

FIG. 2E illustrates an example diagram of a UI 292 that illustrates insight assistant window 220 configured to receive a query 293 and provide query response 294, according to an embodiment. For example, a user may enter query 293 to request information about a number of emergency response assets (e.g., drones) and may request an estimated time of arrival (ETA) for first responders. AI assistant system may provide query response 294 within insight assistant window 220 or in another region in UI 292 that is visible to the user.

Figure 3A:
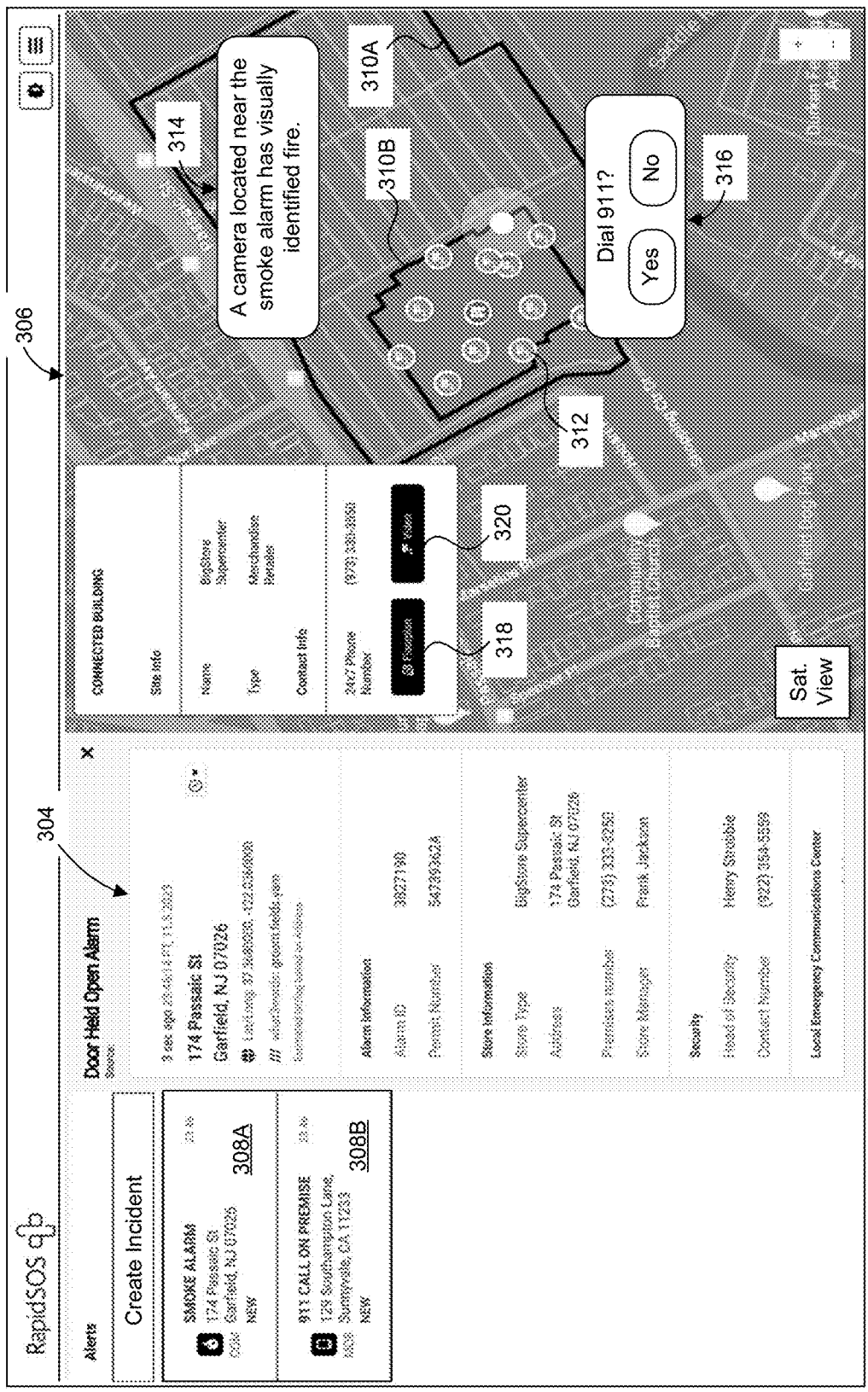
Figure 3C:
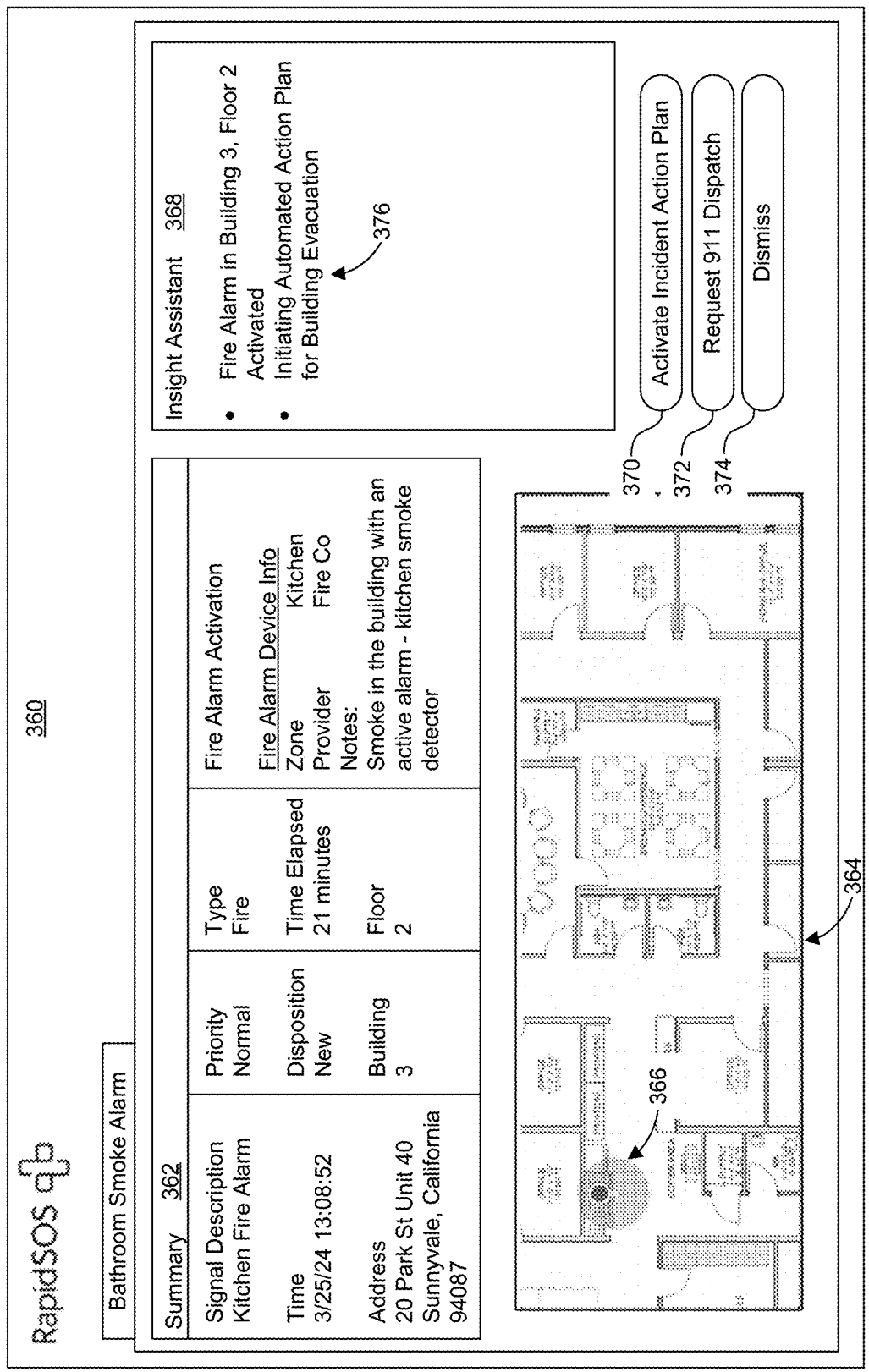

FIGS. 3A, 3B, and 3C illustrate example diagrams of UIs for operations center emergency management applications that are example implementations of operations center emergency management application 130 that may be operated by an operations center computing system (e.g., operations center computing system 110), in accordance with aspects of the disclosure. The examples of operations center emergency management applications illustrate emergency response insights that may be displayed or otherwise provided to an operations center operator based on the aggregation of data sources with context-specific training data in a RAG architecture, according to an embodiment.

One example of a data source that may be used to generate emergency response insights for an operations center (e.g., a GSOC, a rail NOC, etc.) is radio data. Radio data may include a transcription or audio version of a radio-based dispatch. The radio-based dispatch may be recorded, transcribed, and analyzed for address identification and other incident characteristics. The AI assistant system may be at least partially trained using transcripts or audio recordings of prior radio dispatches, and current radio-based dispatches may be applied to AI assistant system to support the generation of emergency response insights, according to implementations of the disclosure. 911 call audio, social media feeds, alarm data, and other sensor data (e.g., proximity, shock, moisture, motion, open door) may also be used to generate emergency response insights.

FIG. 3A illustrates an example of a UI 300 that may be used by operations centers to manage emergencies and receive emergency response insights from an AI assistant system, in accordance with aspects of the disclosure. UI 300 includes an incident queue 302, a data card 304, and a map 306. Incident queue 302 may be used to organize and visualize one or more incidents 308 (individually, incident 308A and 308B), according to an embodiment. Examples of incidents may include an incident 308A that indicates a smoke alarm activation at a first location, and a second incident 308B that indicates a 911 call has occurred on a premises associated with (e.g., managed by, monitored by, etc.) a particular operations center, according to an embodiment.

Data card 304 may provide various information related to one or more of the incidents 308 in incident queue 302, according to an embodiment. For a selected incident, data card 304 may display address information, alarm information, sensor manufacturer information, a point of contact, contact information for the point of contact, a time of alarm or sensor activation, or the like.

Map 306 may display one or more premises that are associated with a particular operations center. Map 306 may display one or more boundaries 310 (individually, boundary 310A and boundary 310B) that are associated with premises being monitored by a particular operations center. For example, a boundary 310A may outline a parking structure for a premises, and a boundary 310B may outline a building for the premises. Map 306 may be used to illustrate available assets 312, such as cameras, and sensors that may be used, to monitor boundaries 310. Map 306 may also be used to illustrate a region of interest 313 that may be representative of a generalized location of a 911 call. Region of interest 313 may be determined from call data 122 and/or location data 146 and may be illustrated to indicate a region on the premises where an emergency call has been placed. Sharing region of interest 313 may enable an operations center operator to guide emergency responders to efficiently (e.g., by unlocking particular doors) to the person requesting emergency services. In exchange for receiving region of interest 313, the business or organization associated with the premises may share information (e.g., floor plans, video feeds, audio feeds) with the responding ECC and/or with the emergency response data system to facilitate response to the request for emergency services, for example.

AI assistant system (e.g., AI assistant system 116, shown in FIG. 1B) may provide suggestions, may perform actions, may provide notifications, or may provide other emergency response insights for a particular premises based on the aggregation and analysis of one or more data sources and incidents 308, according to an embodiment. For example, AI assistant system may use UI 300 to display a notification 314 that a fire has been visually identified, based on an analysis of camera data. AI assistant system may use UI 300 to suggest an action 316 to dial 911 or otherwise initiate communication with an emergency communication center. AI assistant system may use UI 300 to suggest additional actions such as display the floor plan with a button 318 or to display live video feed with a button 320, according to an embodiment.

FIG. 3B illustrates a diagram of a UI 330 that is another example of an operations center emergency management application that is configured to receive emergency response insights from an AI assistant system, according to an embodiment. UI 330 may include an incident queue 332 that displays a number of incidents 334 that have occurred on a particular premises, according to an embodiment. The premises may be displayed with a boundary 336 that may be highlighted on a map 338. UI 300 may include a data card 340 having various premises information that may be received, aggregated, and analyzed by the AI assistant system to support generation of emergency response insights, according to an embodiment. UI 330 may include an insight assistant window 342 that includes an example of a notification 344 that a person on the premises 346 appears to be experiencing heart related issue. Insight assistant window 342 may be used to receive queries from an operator of UI 330. AI assistant may use UI 330 two suggest an action 348 to, for example, dispatch security to open a door for emergency medical services, based on aggregation and analysis of various emergency related signals.

FIG. 3C illustrates an example diagram of a UI 360 of an operations center emergency management application that is at least partially supported by an AI assistant system, in accordance with aspects of the disclosure. UI 360 is an example of what may be displayed in response to selection of one of incidents 334 of incident queue 332 (shown in FIG. 3B), for example. UI 360 illustrates a incidents summary 362, a floor plan 364, an incident location 366, an insight assistant window 368, and optional action buttons 370, 372, and 374, according to an embodiment. Incident summary 362 may display signal description, a time of activation, address, a priority level, a building identifier, a floor associated with the incident, a type of incident (e.g., fire), and additional information about the particular alarm that is activated (e.g., a fire alarm).

Floorplan 364 may provide a visual indication to the operator of a layout of a portion of a building and may illustrate the location of a signal source (e.g., alarm location or location where an emergency calls initiated). AI assistant system may use UI 360 to at least partially populate insight assistant window 368 with one or more emergency response insights, according to an embodiment. AI assistant system may use UI 360 to display a summary notifications 376, for example, that a fire alarm is activated and that an action plan has been initiated. Initiation of an action plan by the AI assistant system may include, but is not limited to, the operation of controllers on a premises to, for example, unlock and/or open doors and illuminate emergency lighting.

The emergency response data system and/or AI assistant system may support operations of action buttons 370, 372, and 374 to enable an operator to activate an incident action plan, request 911 dispatch, or dismiss previous actions, respectively. AI assistant system may selectively display action buttons 370, 372, and 374 in UI 360, or action buttons 370, 372, and 374 may be displayed statically, for example.

Figure 4A:
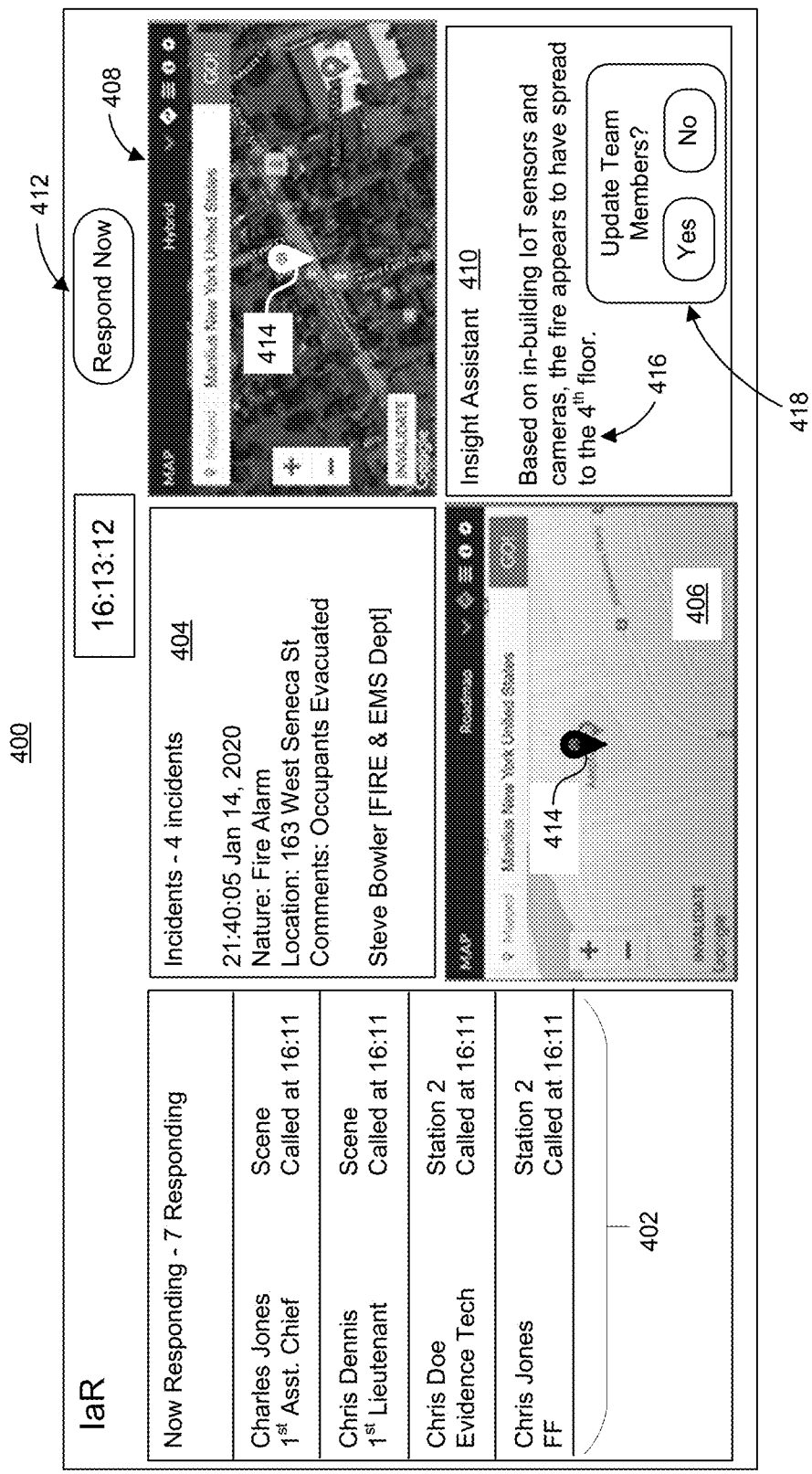
FIGS. 4A and 4B illustrate example diagrams of user interfaces for a first responder emergency management application, in accordance with embodiments of the disclosure.
Figure 4B:
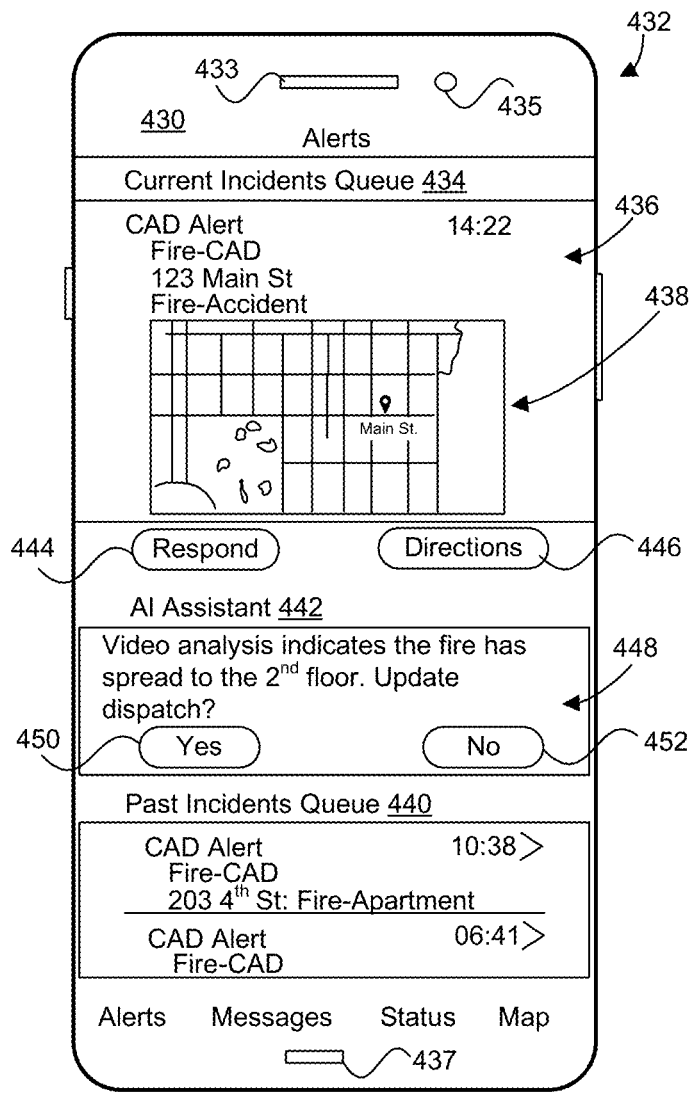

FIGS. 4A and 4B illustrate example diagrams of UIs that are example implementations of first responder emergency management application 132 that may be operated by a first responder computing device (e.g., first responder computing device 112), in accordance with aspects of the disclosure. Examples of first responder computing devices include, but are not limited to, in-vehicle displays, smart phones, tablets, laptops, personal computers, smart televisions, radios, augmented reality headsets, and the like.

The field of emergency response is crucial for public safety and well-being. First responders often encounter dynamic and complex situations that demand quick, informed decisions. Existing technologies have limitations in providing real-time, hands-free support. Advantageously, an AI-enabled virtual assistant can revolutionize the capabilities of first responders by providing real-time information, decision support, and situational awareness. Embodiments of the disclosed first responder emergency management application is an AI-enabled virtual assistant that is configured to enhance the efficiency, safety, and effectiveness of first responders. The disclosed AI assistant system provides AI-enabled virtual assistance to leverage voice recognition, natural language processing, and data integration to provide real-time information, decision support, and communication capabilities, according to embodiments. The AI assistant system may enable two-way communication, data retrieval, language translation, and wearable device integration in a seamless, secure, and privacy-aware manner.

FIG. 4A illustrates a diagram of a UI 400 that may be supported by or at least partially updated by an emergency response data system and/or an AI assistant system to provide emergency response data and insights to support the safety and response of first responders to emergency events, in accordance with aspects of the disclosure. UI 400 may include one or more of a responder queue 402, an incident card 404, a first map 406, a second map 408, and/or an insight assistant window 410, according to an embodiment. A UI operator may select a respond button 412 to add to or modify the responder queue 402. The responder queue 402 include names, locations, ranks, and/or roles of people responding to an emergency. Incident card 404 displays details for one or more received incidents. Maps 406 and 408 are configured to show a location 414 of a received incident.

The AI assistant system may use UI 400 to display emergency response insights related to first responders, according to an embodiment. For example, AI assistant system 116 (shown in FIG. 1B) may push or display a notification 416 to insight assistant window 410 to provide a real-time update on the spread of a fire, based on one or more cameras and/or Internet of Things (IoT) sensors located in a building. AI assistant system 116 may provide an option for an action 418 to update team members of notification 416, according to an embodiment. AI assistant system 116 may receive audio or text-based information from an operator of UI 400 (e.g., through insight assistant window 410), and AI assistant 116 may provide query responses or emergency response insights that are based on the audio or text-based information, for example.

FIG. 4B illustrates an example diagram of a UI 430 that may be supported by or at least partially updated by an emergency response data system and/or an AI assistant system to provide emergency response data and insights to support the safety and response of first responders to emergency events. UI 430 may be part of a mobile device app that is operated by a mobile device 432 (e.g., smart phone, tablet, augmented reality headset, virtual reality headset, smart watch, etc.). Mobile device 432 may include a speaker 433, a camera 435, and a microphone 437 to enable information exchange between mobile device 432 and a user.

UI 430 may include a current incidents queue 434, an incident description 436, a map 438, a past incidents queue 440, and an (AI) insight assistant window 442, according to an embodiment. UI 430 may also include a respond button 444 to notify others of acceptance of response to an incident. UI 430 may also include a directions button 446 to receive additional navigation instructions for an incident.

The AI assistant system may use UI 430 to display emergency response insights related to first responders, according to an embodiment. For example, AI assistant system 116 may push or display a notification 448 in insight assistant window 442 to, for example, provide a real-time update on the spread of a fire, based on one or more cameras and Internet of Things (IoT) sensors located in a building. AI assistant system 116 may also provide a suggested action (e.g., to update team members of notification 448), according to an embodiment. UI elements 450 and 452 (e.g., buttons) may be provided to enable an operator to accept or reject a suggested action.

The disclosed first responder emergency management applications may include or support a number of miscellaneous features that may operate together to improve public safety, save lives, and support the crucial work of first responders across various emergency scenarios. Voice-Activated Interface: the first responder emergency management application may support a voice-activated interface, allowing first responders to interact with it using natural language commands. This feature may enable quick and hands-free communication in the field. Real-Time Information Retrieval: the first responder emergency management application may support retrieving and delivering critical information to first responders. This information could include details about the incident they are responding to, maps, building layouts, emergency contacts, and hazardous materials information. Situational Awareness: the first responder emergency management application may support real-time situational awareness by integrating with various data sources, such as IoT sensors, security cameras, and other data feeds. It may display portions of this data to keep responders informed about changing conditions on the scene. Decision Support: the first responder emergency management application may offer decision support by providing recommendations and options based on the available information. For instance, it might suggest alternative routes to a scene, evacuation strategies, or treatment protocols. Language Translation: the first responder emergency management application may support multi-lingual settings and may provide instant language translation to facilitate communication with victims, witnesses, or other responders who speak different languages. The multi-lingual settings may be supported by the AI assistant system or a specific natural language processing sub-system associated with emergency response data system. Emergency Medical Support: for medical emergencies, the first responder emergency management application may assist in diagnosing conditions, offering step-by-step treatment guidance, and accessing a patient's medical history if available. Rescue and Evacuation Guidance: in the case of disasters or structural collapses, the first responder emergency management application may help locate and rescue victims by providing guidance on where to search and how to safely evacuate. Voice Recognition and Natural Language Processing: the first responder emergency management application may support voice recognition and natural language processing capabilities, allowing it to understand complex inquiries and commands even in noisy or chaotic environments. Two-Way Communication: the first responder emergency management application may facilitate two-way communication with dispatch centers, command posts, and other first responders, enabling seamless coordination and reporting through text-messaging, audio communications, and/or video conferencing. Wearable Device Integration: the first responder emergency management application may support integration with wearable devices like smart helmets or augmented reality (AR) glasses, offering a heads-up display with vital information, live video feeds, and navigation guidance. Learning and Adaptation: the first responder emergency management application may learn from the experiences and feedback of first responders, improving its capabilities and responses to different situations. Interoperability: the first responder emergency management application may be configured to seamlessly integrate with existing emergency response technologies (e.g., computer-aided dispatch API integration), communication networks, and information systems. Scalability: the first responder emergency management application may support scalable accommodation of various emergency response agencies, from small municipal departments to large metropolitan operations.

Figure 5:
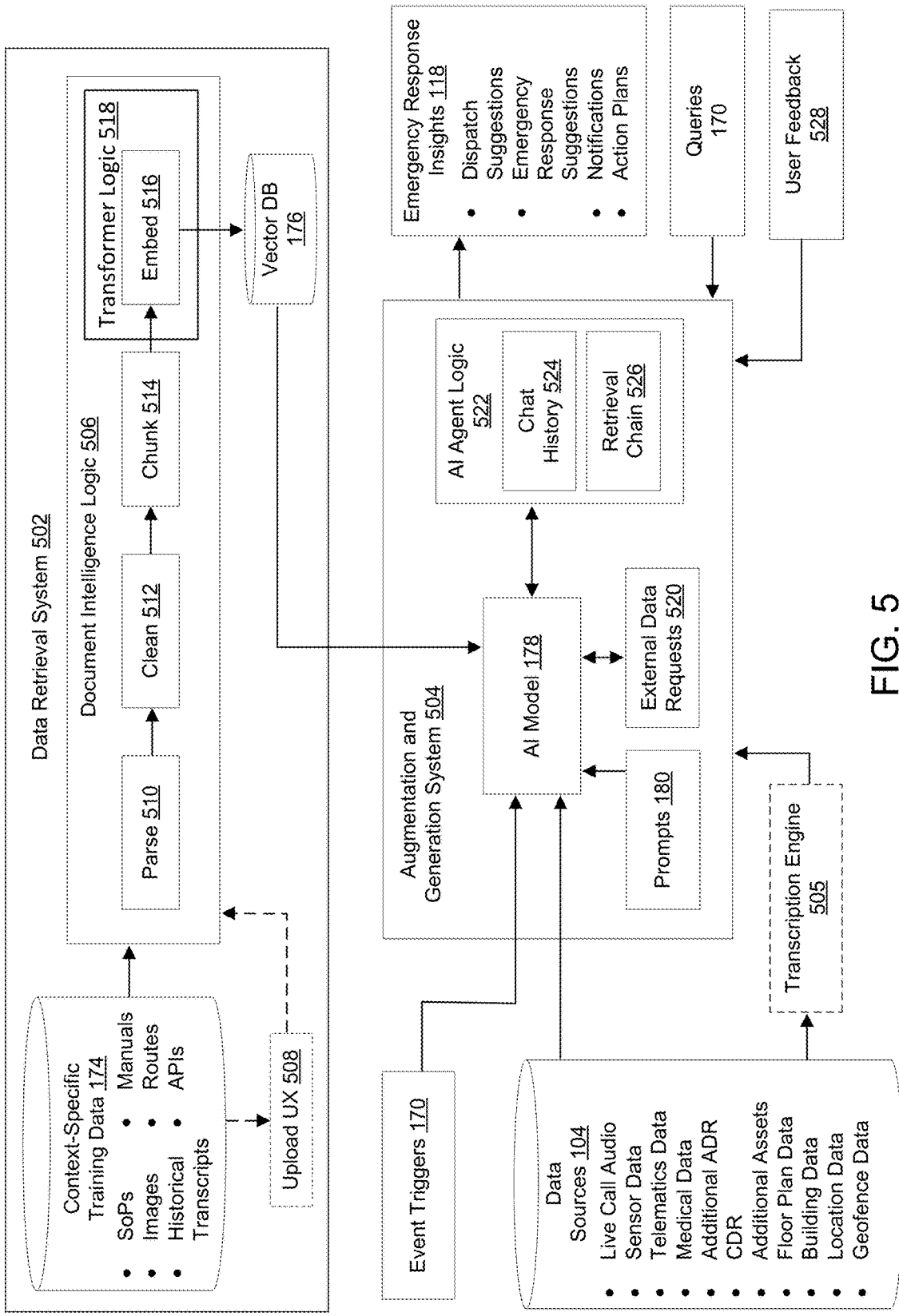
FIG. 5 illustrates a diagram of an emergency response retrieval, augmentation, and generation (RAG) system, in accordance with embodiments of the disclosure.

FIG. 5 illustrates an example of a block diagram of an emergency response RAG system 500 that is configured to retrieve, aggregate, and analyze information to generate insights that can be extracted from the aggregated information to reduce emergency response times and increase safety of first responders, in accordance with aspects of the disclosure. Emergency response RAG system 500 is an example implementation of RAG system 162 (shown in FIG. 1B), according to an embodiment. Emergency response RAG system 500 is an example implementation of the AI assistant system disclosed herein, in accordance with aspects of the disclosure. Emergency response RAG system 500 includes a data retrieval system 502 and an augmentation and generation system 504, according to an embodiment. The data retrieval system 502 and augmentation generation system 504 work in concert to provide emergency response insights 118 that are based on context-specific training data 174, characteristics of call data, characteristics of event triggers 170, and data sources 104.

Data retrieval system 502 includes document intelligence logic 506 that is configured to condition context-specific training data 174 into numerical representations that can be stored and searched in vector database 176, according to an embodiment. In one embodiment, emergency response RAG system 500 provides an upload UI 508 that enables users to selectively provide relevant training data 174 for conditioning and upload into vector database 176.

Document intelligence logic 506 may be configured to perform a number of operations on context-specific training data 174 to convert training data 174 into semantically correlated vectors that are stored in vector database 176, according to an embodiment. Document intelligence logic 506 may include a parse operation 510, a clean operation 512, a chunk operation 514, and an embed operation 516, according to an embodiment. Although document intelligence logic 506 is represented as a single category of logic, the various operations may be performed by one or more independent tools, scripts, or software programs. Parse operation 510 includes processing raw input data (e.g., text, documents, images, or web pages) to extract meaningful information. This may include reading various formats (e.g., HTML, PDF, etc.), tokenizing, and extracting useful text.

Parse operation 510 includes breaking down the source material into a format that can be processed in subsequent stages by, for example, understanding the structure of raw data and extracting relevant content from it. Clean operation 512 includes refining the parsed data to remove noise, redundant information, or irrelevant content. This could involve normalizing text (like converting to lowercase), removing special characters, filtering out stop words, and correcting formatting issues. Clean operation 512 further conditions the data to be high-quality and relevant as possible for embedding. Chunk operation 514 includes breaking the cleaned data into smaller, manageable pieces or "chunks" that are suitable for further processing. Since large documents or long text segments may be difficult to process in one go, chunking can condition the data so that the data can fit into the input size limitations of the AI model (e.g., AI model 178) and can be retrieved efficiently. Chunk operation 514 divides data into pieces that the AI model can handle within its capacity, which may be based on the token limit for the AI model. Embed operation 516 includes converting the chunks of data into numerical vectors (embeddings) using a neural network or language model. The embeddings may capture the semantic meaning of the chunks and enable efficient comparison and retrieval (e.g., during a vector search). During the RAG process, embeddings of both the query and the data are compared to retrieve the most relevant chunks. Embed operation 516 generally relates to transforming data into a machine-readable format (vectors) that the AI model can use to identify relevant information based on (semantic) similarity. Embed operation 516 may be performed by transformer logic 518, according to an embodiment. Transformer logic 518 may be a LLM or AI model configured to perform embedding operations, according to an embodiment.

Augmentation generation system 504 selectively queries vector database 176 and generates emergency response insights 118, based on one or more of the content of vector database 176, data sources 104, and/or one or more event triggers 170 (e.g., characteristics of call audio to an ECC, GSOC, rail NOC, etc.), according to an embodiment. Augmentation and generation system 504 includes AI model 178, prompts 180, external data requests 520, and AI agent logic 522, according to an embodiment. External data requests 520 may include API requests to traffic feeds (e.g., Waze API), weather feeds (e.g., Tomorrow.io), social media feed, public record searches, or the like. External data requests 520 may be used to further enrich the generation of emergency response insights 118.

AI agent logic 522 represents scripts, decision trees, processes, and instructions that may be part of AI model 178 or that may complement AI model 178 in interacting with a user (e.g., dispatcher, telecommunicator, operations center operator, first responder, etc.), according to an embodiment. AI agent logic 522 may include live assistant logic 160 (shown in FIG. 1B) or may be a subset of live assistant logic 160. AI agent logic may be configured to at least partially perform one or more of processes 600, 700, 800, 900, 1000, and/or 1100, in accordance with aspects of the disclosure. AI agent logic 522 may maintain chat history 524 to provide context to subsequently provided emergency response insights 118. AI agent logic 522 may be based on a retrieval chain 526 that may include a sequence of steps or processes involved in fetching relevant information from a large corpus or database to answer a query. In the context of a RAG architecture, a retrieval chain includes operations that help gather and rank the documents or data snippets.

Emergency response RAG system 500 may include a transcription engine 500, according to embodiments of the disclosure. Transcription engine 500 may receive various types of audio (e.g., live 911 calls, live operations centers calls, first responder calls, over the air radio dispatch audio, audible first responder queries, etc.) and may provide transcripts to augmentation and generation system 504 to support the generation of emergency response insights 118, for example.

Emergency response RAG system 500 may also receive and operate based on user feedback 528, according to an embodiment. User feedback 528 may indicate that a dispatcher determinate code appears incorrect, that an address appears incorrect, that instructions or suggestions are unclear, or that an automated action is not to be performed in the future. User feedback 528 may be stored in a data structure and/or may be included in chat history 524 to provide context for subsequently generated emergency response insights 118.

Emergency response RAG system 500 may search the vector database in response to receiving one or more queries 172, according to an embodiment. The search may be performed without a call-based trigger and/or without a data-based trigger, and receipt of the one or more queries 172 may trigger execution of the AI assistant workflow, inclusive of one or more processes disclosed herein, in accordance with various embodiments of the disclosure.

Figure 6:
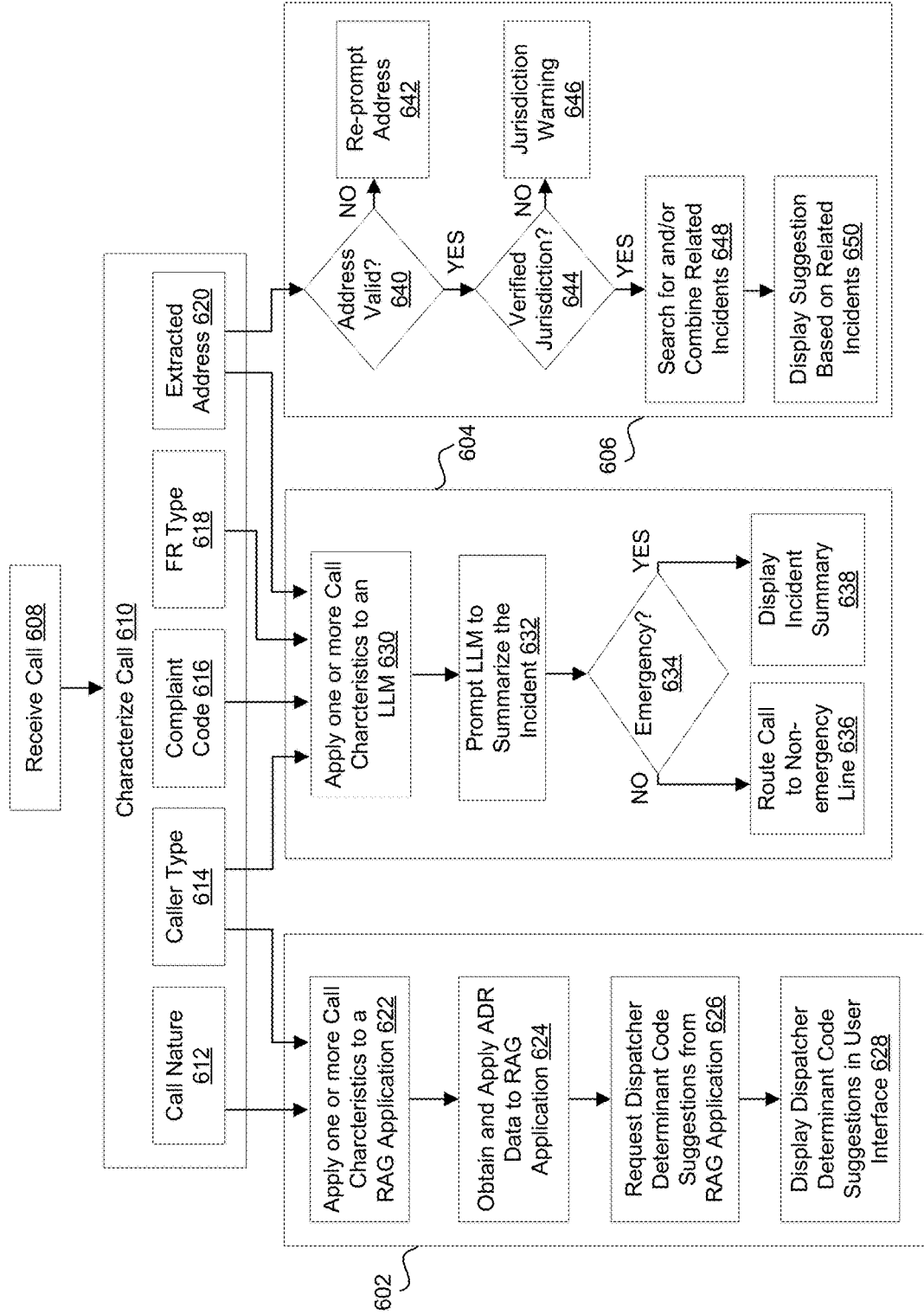
FIG. 6 illustrates an example flow diagram of a process for providing an emergency response digital assistant, in accordance with embodiments of the disclosure.

FIG. 6 illustrates a flow diagram of a process 600 for providing an emergency response digital assistant for an ECC, an operations center, and/or a first responder, in accordance with aspects of the disclosure. Process 600 may also include a sub-process 602 for generating protocol suggestions, a sub-process 604 for displaying an incident summary, and a sub-process 606 for performing address-related operations, according to various aspects of the disclosure. At operation 608, process 600 receives a call, according to an embodiment of the disclosure. The call may be a 911 call, a call to an operations center, or a call to/from a first responder. The call may be representative of another event trigger, such as a sensor data event (e.g., fire alarm activation). Operation 608 proceeds to operation 610, according to an embodiment.

At operation 610, process 600 characterizes the call, according to an embodiment. Process 600 may characterize the call using an LLM, using one or more algorithms, and/or using a machine learning model or other AI model, according to an embodiment. Characterizing the call may include, but is not limited to, prompting an LLM to: determine a nature of a call 612, determine a caller type 614, determine a complaint code 616, determine a type of first responder needed 618, and/or extract an address 620, according to an embodiment. Operation 610 may include providing a transcript of a live 911 call to the LLM, according to one embodiment. Operation 610 may include providing live 911 call audio to the LLM incrementally (e.g., in five second increments) to enable real-time analysis of the conversation occurring during the call, according to one embodiment. Call audio data may be provided from an ECC or operations center using digital audio transmission devices (e.g., audio transmitter 141 and/or 143) installed or integrated with call handling equipment (e.g., telephone services) at the ECC and/or operations center, in accordance with aspects of the disclosure. Call nature 612 may include the type of emergency that is being reported. Caller type 614 may include age and/or, gender, or other demographic characterizations of the caller. Complaint code 616 may be a dispatcher determinant code or similar subject matter codification of the call. First responder type 618 may include firefighter, EMS, police officer, or other type of first responder that is appropriate to respond to the call nature 612. Extracted address 620 includes the address or location of the reported incident. Operation 610 may concurrently proceed to sub-processes 602, 604, and 606, according to one embodiment. In another embodiment, one or more of sub-processes 602, 604, or 606 may proceed prior to one or more others of sub-processes 602, 604, or 606.

At operation 622, sub-process 602 includes applying one or more call characteristics to a RAG application (e.g., RAG system 162), according to one embodiment. Operation 622 may be configured to apply call nature 612 and caller types 614 to a RAG application to support determining a relevant dispatcher determinant code, according to one embodiment. Operation 622 proceeds to operation 624, according to an embodiment.

At operation 624, sub-process 602 includes obtaining and applying additional data repository (ADR) data to the RAG application, according to one embodiment. ADR data may represent one or more of the data sources 104 and may include, but is not limited to, telematics data, medical data, panic button data, available asset data, and other sensor data. Operation 624 may proceed to operation 626.

At operation 626, sub-process 602 includes requesting dispatcher determinant code suggestions from the RAG application, according to an embodiment. In response to receiving a prompt, an LLM or other AI model of the RAG application may search a vector database for context-specific training data (e.g., emergency protocols or dispatcher determinant codes) to return dispatcher determinant codes suggestions based on the one or more call characteristics and/or based on the ADR data. Operation 626 may proceed to operation 628.

At operation 628, sub-process 602 includes displaying dispatcher determinant code suggestions in a user interface, in accordance with aspects of the disclosure. The user interface may be a user interface of an emergency management application operated by an ECC dispatcher, a telecommunicator, an operations center operator, or first responder, according to one embodiment.

At operation 630, sub-process 604 includes applying one or more call characteristics to an LLM, according to an embodiment. Call characteristics may also include a transcript (full or partial) of the call. Operation 630 may include applying caller type 614, complaint code 616, first responder type 618, and extracted address 620 to the LLM. Operation 630 may proceed to operation 632.

At operation 632, sub-process 604 may include prompting the LLM to summarize the incident, according to an embodiment. Operation 632 may proceed to operation 634.

At operation 634, sub-process 604 may include determining whether the incident is an emergency, according to an embodiment. If the incident is not an emergency, operation 634 may proceed to operation 636. If the incident is an emergency, operation 634 may proceed to operation 638, according to an embodiment.

At operation 636, sub-process 604 may include routing the call to a non-emergency line, according to an embodiment.

At operation 638, sub-process 604 may include displaying the incident summary in a UI of an emergency management application, according to one embodiment.

At operation 640, sub-process 606 includes determining whether the extracted address is valid, according to one embodiment. The extracted address 620 may be validated by applying the address to one or more address verification services, according to an embodiment. If the address is not valid, operation 640 may proceed to operation 642. If the address is valid, operation 640 may proceed to operation 644.

At operation 642, sub-process 606 includes re-prompting a user for an address, according to an embodiment. Operation 642 may return to operation 610 so that a new extracted address 620 may be generated.

At operation 644, extracted address 620 is compared to geofence boundaries to verify that a particular ECC has jurisdiction over the address, according to one embodiment. If a particular ECC does not have jurisdiction over an address, operation 644 may proceed to operation 646. If a particular ECC has jurisdiction over an address, operation 644 proceeds to operation 648.

At operation 646, sub-process 606 includes providing a jurisdiction warning to an operator using an emergency management application for an ECC, operations center, and/or first responder.

At operation 648, sub-process 606 includes searching for and/or combining related incidents, according to an embodiment. Related incidents may be defined as incidents that are temporally and/or spatially proximate (e.g., within 50 yards of each other and/or within 5 minutes of each other) and/or are related to a common incident. Operation 648 may proceed to operation 650.

At operation 650, sub-process 606 includes displaying a suggestion based on the related incidents, according to an embodiment. The suggestion may include, but is not limited to, group messaging, conference calling, and/or videoconferencing the group of people of the related incident, for example.

Figure 7:
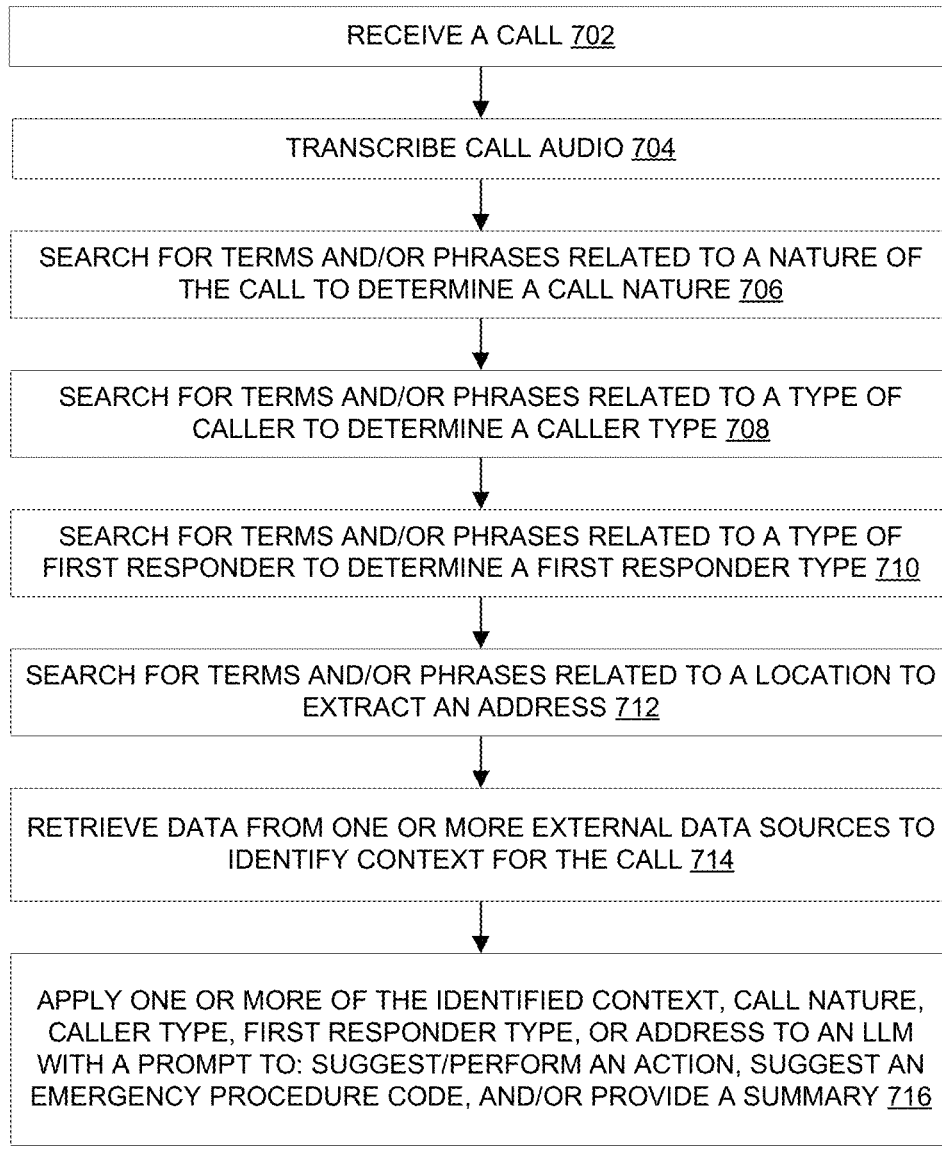
FIG. 7 illustrates an example flow diagram of a process for characterizing a call, in accordance with embodiments of the disclosure.

FIG. 7 illustrates a flow diagram of a process 700 for characterizing a call, in accordance with aspects of the disclosure. Process 700 is an example algorithm that may be used within operation 610 (shown in FIG. 6), for example. The order in which some or all of the process operation blocks appear in process 700 should not be deemed limiting. Rather, one of ordinary skill in the art having the benefit of the present disclosure will understand that some of the process blocks may be executed in a variety of orders not illustrated, or even in parallel.

At operation 702, process 700 includes receiving a call, according to an embodiment. The call may be a 911 call to an ECC or may include a call to an operations center (e.g., GSOC, rail NOC, etc.). Operation 702 may proceed to operation 704.

At operation 704, process 700 includes transcribing call audio, according to an embodiment. Transcription is an optional operation as some LLM or AI models may receive and analyze audio data directly. Operation 704 may proceed to operation 706.

At operation 706, process 700 includes searching for terms and/or phrases related to a nature of a call to determine a call nature. Operation 706 may proceed to operation 708.

At operation 708, process 700 includes searching for terms and/or phrases related to a type of caller to determine a caller type, according to an embodiment. Operation 708 may proceed to operation 710.

At operation 710, process 700 includes searching for terms and/or phrases related to a type of first responder to determine a first responder type, according to an embodiment. Operation 710 may proceed to operation 712.

At operation 712, process 700 includes searching for terms and/or phrases related to a location to extract an address from the call (e.g., call audio), according to an embodiment. Operation 712 may proceed to operation 714.

At operation 714, process 700 includes retrieving data from one or more external data sources to identify context the call, according to an embodiment. Operation 714 may proceed to operation 716.

At operation 716, process 700 includes applying one or more of the identified context, call nature, caller type, first responder type, or address to an LLM or AI model with a prompt to suggest/perform an action, suggest an emergency procedure code, and/or provide a summary, in accordance with various aspects of the disclosure.

Figure 8:
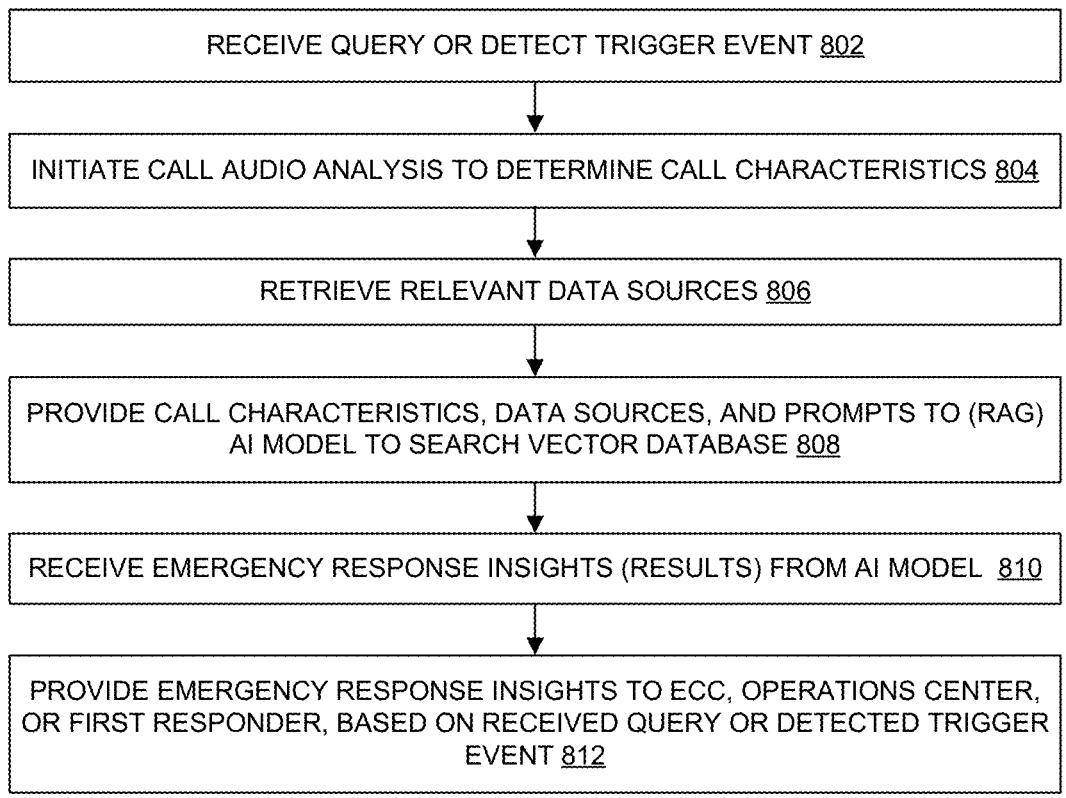
FIG. 8 illustrates an example flow diagram of a process for providing a live artificial intelligence (AI) assistant, in accordance with embodiments of the disclosure.

FIG. 8 illustrates a flow diagram of a process 800 for providing a live AI assistant, in accordance with aspects of the disclosure. The order in which some or all of the process operation blocks appear in process 800 should not be deemed limiting. Rather, one of ordinary skill in the art having the benefit of the present disclosure will understand that some of the process blocks may be executed in a variety of orders not illustrated, or even in parallel. In some embodiments, a live AI assistant flow is initiated by a call (e.g., a 911 call or a call to a GSOC). In some embodiments, the AI assistant flow is executed based on receipt of a query, without the call audio. For example, a query may be submitted by an ECC operator, may be submitted by a GSOC operator, may be submitted by a train NOC operator, and/or may be submitted by a first responder (e.g., with a first responder device), for example. The query may be used to prompt the RAG AI model to search a vector database, with or without a call or other data source, for example.

At operation 802, process 800 includes receiving a query or detecting a trigger event, according to an embodiment. The query may be entered into an emergency management application by an ECC operator, operations center operator, or first responder. The trigger event may be based on one or more data sources (e.g., sensor data, telematics data, medical device data, etc.). Operation 802 may proceed to operation 804.

At operation 804, process 800 includes initiating call audio analysis to determine call characteristics, according to an embodiment. Operation 804 may proceed to operation 806.

At operation 806, process 800 includes retrieving relevant data sources, according to an embodiment. Operation 806 may proceed to operation 808.

At operation 808, process 800 includes providing call characteristics, data sources, and prompts to a (RAG) AI model to search a vector database, according to an embodiment. The database search may be a vector search, a content search, or a hybrid between a vector search and a content search. Operation 808 may proceed to operation 810.

At operation 810, process 800 includes receiving emergency response insights (results) from the AI model, according to an embodiment. Operation 810 may proceed to operation 812.

At operation 812, process 800 includes providing emergency response insights to ECC, operations center, or first responder, based on received query or detected trigger event, according to an embodiment.

Figure 9:
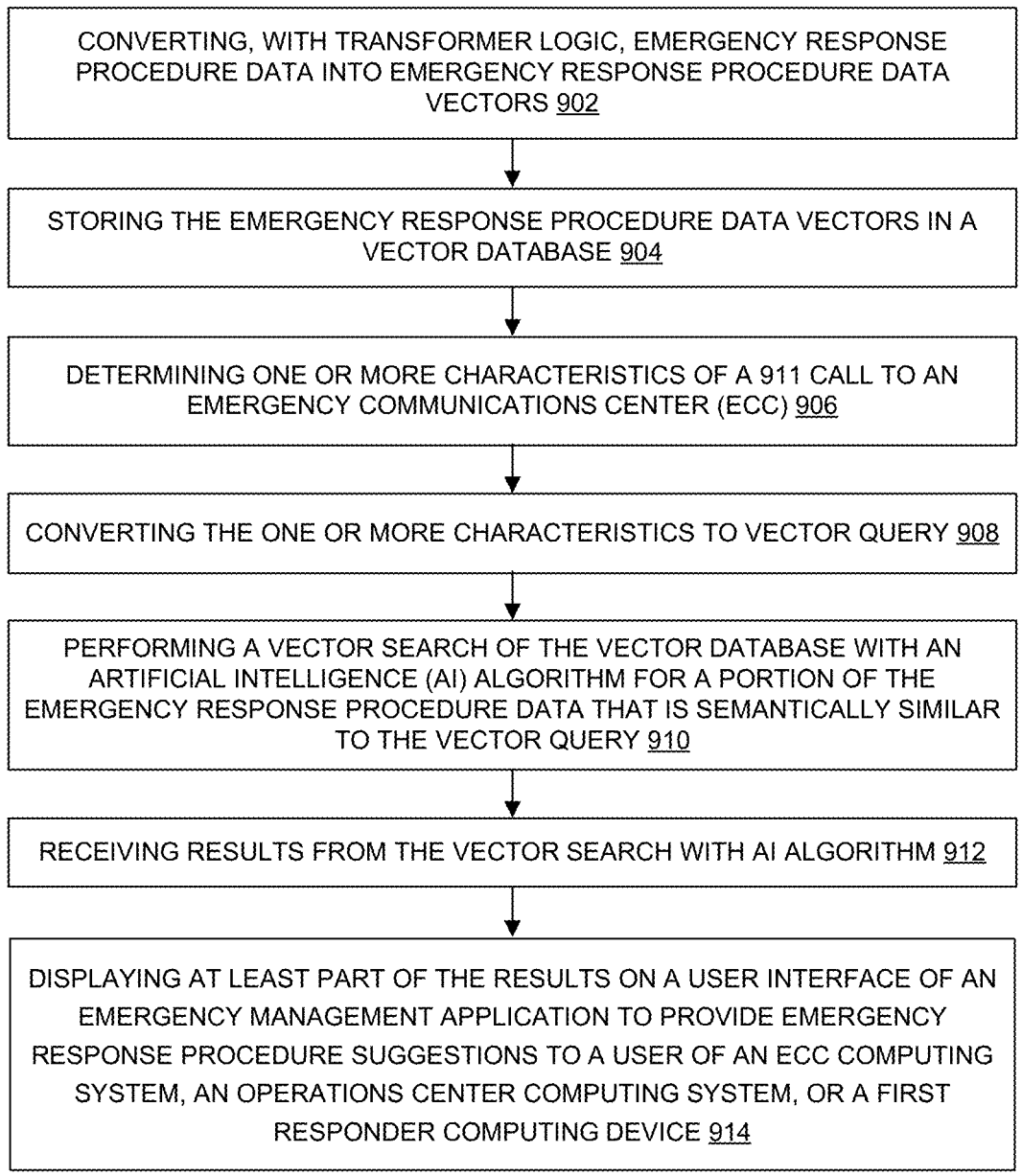
FIG. 9 illustrates a flow diagram of a process for providing digital emergency response assistance, in accordance with embodiments of the disclosure.

FIG. 9 illustrates a flow diagram of a process 900 for providing digital emergency response assistance, in accordance with aspects of the disclosure. The order in which some or all of the process operation blocks appear in process 900 should not be deemed limiting. Rather, one of ordinary skill in the art having the benefit of the present disclosure will understand that some of the process blocks may be executed in a variety of orders not illustrated, or even in parallel.

At operation 902, process 900 includes converting, with transformer logic, emergency response procedure data into emergency response procedure data vectors, according to an embodiment. Operation 902 may proceed to operation 904.

At operation 904, process 900 includes storing the emergency response procedure data vectors in a vector database, according to an embodiment. Operation 904 may proceed to operation 906.

At operation 906, process 900 includes determining one or more characteristics of a 911 call to an emergency communications center (ECC), according to an embodiment. Operation 906 may proceed to operation 908. As above, a query directly into the agent could initiate the vector search, with or without the presence of a 911 call.

At operation 908, process 900 includes converting the one or more characteristics to vector query, according to an embodiment. Operation 908 may proceed to operation 910.

At operation 910, process 900 includes performing a vector search of the vector database with an artificial intelligence (AI) algorithm for a portion of the emergency response procedure data that is semantically similar to the vector query, according to an embodiment. Operation 910 may proceed to operation 912.

At operation 912, process 900 includes receiving results from the vector search with AI algorithm, according to an embodiment. Operation 912 may proceed to operation 914.

At operation 914, process 900 includes displaying at least part of the results on a user interface of an emergency management application to provide emergency response procedure suggestions to a user of an ECC computing system, an operations center computing system, or a first responder computing device, according to an embodiment.

Figure 10:
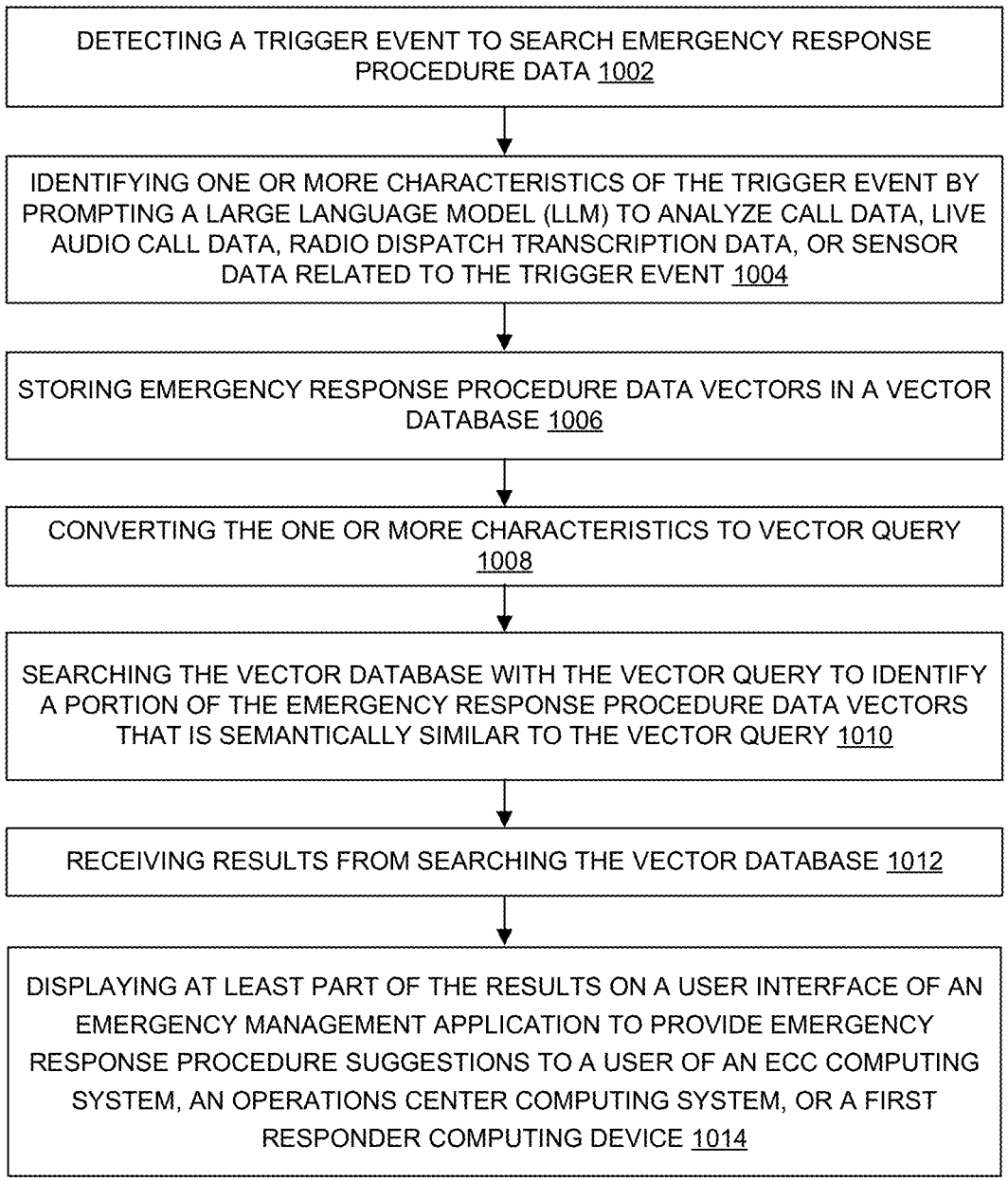
FIG. 10 illustrates a flow diagram of a process for providing digital emergency response assistance, in accordance with embodiments of the disclosure.

FIG. 10 illustrates a flow diagram of a process 1000 for providing digital emergency response assistance, in accordance with aspects of the disclosure. The order in which some or all of the process operation blocks appear in process 1000 should not be deemed limiting. Rather, one of ordinary skill in the art having the benefit of the present disclosure will understand that some of the process blocks may be executed in a variety of orders not illustrated, or even in parallel.

At operation 1002, process 1000 includes detecting a trigger event to search emergency response procedure data, according to an embodiment. Operation 1002 may proceed to operation 1004.

At operation 1004, process 1000 includes identifying one or more characteristics of the trigger event by prompting a large language model (LLM) to analyze call data, live audio call data, radio dispatch transcription data, or sensor data related to the trigger event, according to an embodiment. Operation 1004 may proceed to operation 1006.

At operation 1006, process 1000 includes storing emergency response procedure data vectors in a vector database, according to an embodiment. Operation 1006 may proceed to operation 1008.

At operation 1008, process 1000 includes converting the one or more characteristics to vector query, according to an embodiment. Operation 1008 may proceed to operation 1010.

At operation 1010, process 1000 includes searching the vector database with the vector query to identify a portion of the emergency response procedure data vectors that is semantically similar to the vector query, according to an embodiment. Operation 1010 may proceed to operation 1012.

At operation 1012, process 1000 includes receiving results from searching the vector database, according to an embodiment. Operation 1012 may proceed to operation 1014.

At operation 1014, process 1000 includes displaying at least part of the results on a user interface of an emergency management application to provide emergency response procedure suggestions to a user of an ECC computing system, an operations center computing system, or a first responder computing device, according to an embodiment.

Figure 11:
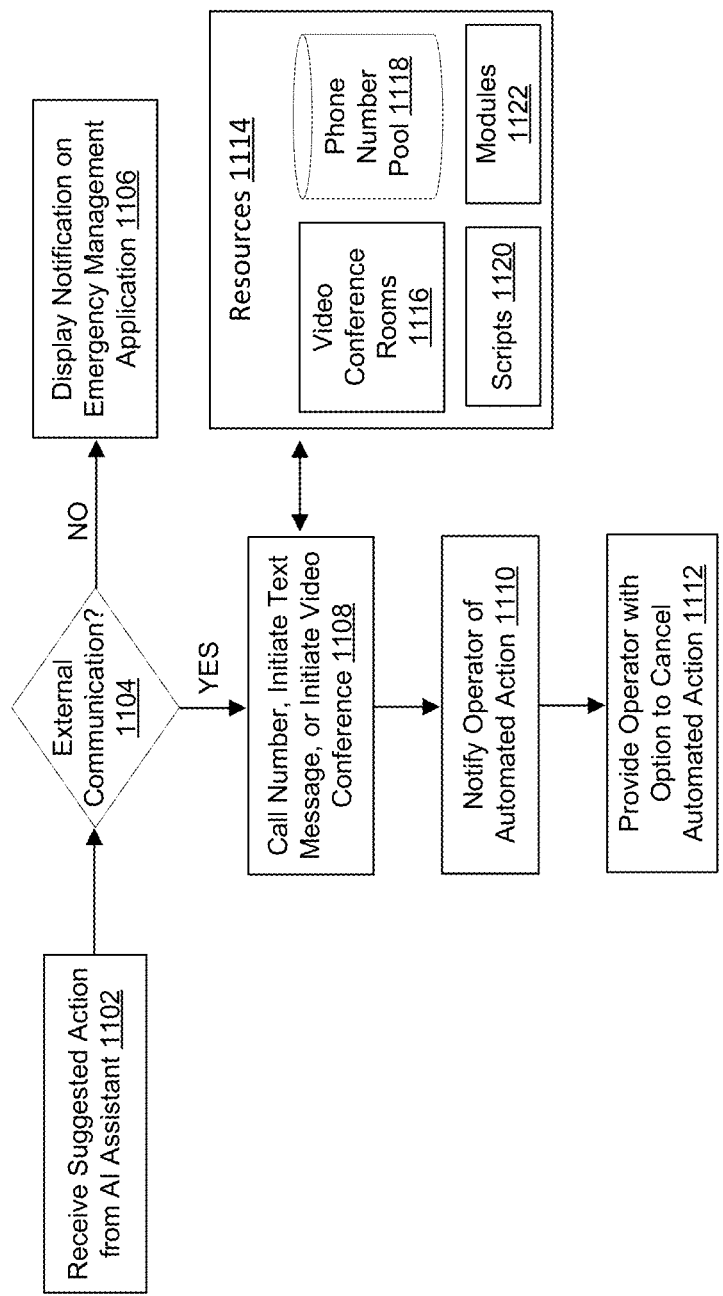
FIG. 11 illustrates a flow diagram of a process for automating emergency response actions for an emergency response management application, in accordance with embodiments of the disclosure.

FIG. 11 illustrates a flow diagram of a process 1100 for automating emergency response actions for an emergency response management application, in accordance with aspects of the disclosure. The order in which some or all of the process operation blocks appear in process 1100 should not be deemed limiting. Rather, one of ordinary skill in the art having the benefit of the present disclosure will understand that some of the process blocks may be executed in a variety of orders not illustrated, or even in parallel.

At operation 1102, process 1100 includes receiving a suggested action from an AI assistant logic, according to an embodiment. Operation 1102 may proceed to operation 1104.

At operation 1104, process 1100 includes determining if the suggested action includes external communication, according to an embodiment. If the suggested action does not include external communication, operation 1104 may proceed to operation 1106. Otherwise, operation 1104 may proceed to operation 1108.

At operation 1106, process 1100 includes displaying a notification on an emergency management application, according to an embodiment.

At operation 1108, process 1100 includes calling a telephone number, initiating a text message, or initiating a video conference, according to an embodiment. Operation 1108 may include using one or more resources 1114, according to an embodiment. Resources 1114 may include, but are not limited to, video conference rooms 1116 (e.g., webRTC conference rooms), a pool of phone numbers 1118, scripts 1120, and software modules 1122. Video conference rooms 1116 and phone number pool 1118 may be accessible via one or more API 1124 that are used by emergency response data system and/or AI assistant system to support automated communications initiation by one or more of the emergency management applications, according to embodiments of the disclosure. Operation 1108 may proceed to operation 1110.

At operation 1110, process 1100 includes notifying an operator of an automated action, according to an embodiment. Operation 1110 may proceed to operation 1112.

At operation 1112, process 1100 includes providing an operator with an option to cancel the automated action, according to an embodiment. Operation 1112 may proceed to operation 1114.

Figure 12:
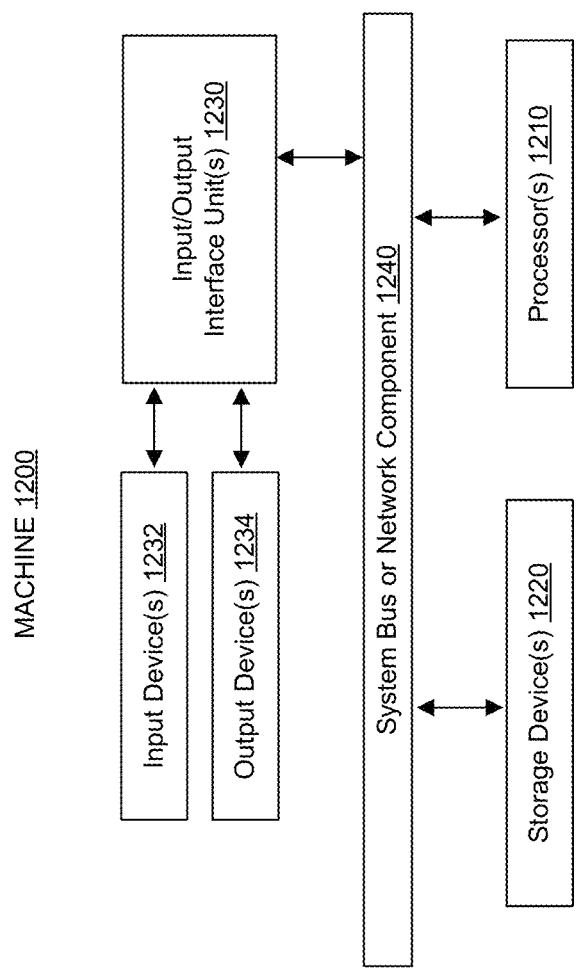
FIG. 12 illustrates an example diagram of a machine, in accordance with embodiments of the disclosure.

FIG. 12 is a high-level block diagram of a machine 1200 that may be used to implement one or more of the operations, devices, and/or systems disclosed herein. Machine 1200 includes one or more processors 1210, one or more input/output interface units 1230, one or more storage devices 1220, and one or more system buses and/or network components 1240 for facilitating the communication of information among the coupled elements. One or more input devices 1232 and one or more output devices 1234 may be communicatively coupled to the one or more input/output interfaces 1230.

The one or more processors 1210 may execute machine-executable instructions (e.g., C or C++ running on the Solaris operating system available from Sun Microsystems Inc. of Palo Alto, Calif. or the Linux operating system widely available from a number of vendors such as Red Hat, Inc. of Durham, N.C.) to effect one or more aspects of the present disclosure. At least a portion of the machine executable instructions may be stored (temporarily or more permanently) on the one or more storage devices 1220 (e.g., non-transitory computer-readable medium) and/or may be received from an external source via one or more input interface unit 1230.

In one embodiment, machine 1200 may be one or more conventional personal computers, servers, distributed computing systems, augmented reality devices, virtual reality devices, wearable systems, and/or computing devices. The processors 1210 may be one or more microprocessors. The bus 1240 may include a system bus. The storage devices 1220 may include system memory, such as read only memory (ROM) and/or random access memory (RAM). The storage devices 1220 may also include a hard disk drive for reading from and writing to a hard disk, a magnetic disk drive for reading from or writing to a (e.g., removable) magnetic disk, and an optical disk drive for reading from or writing to a removable (magneto-) optical disk such as a compact disk or other (magneto-) optical media.

A user may enter commands and information into the personal computer through input devices 1232, such as a keyboard and pointing device (e.g., a mouse) for example. Other input devices such as a microphone, a joystick, an image sensor, a game pad, a satellite dish, a scanner, or the like, may also (or alternatively) be included. These and other input devices are often connected to the processing unit(s) 1210 through an appropriate interface 1230 coupled to the system bus 1240. The output devices 1234 may include a monitor or other type of display device, which may also be connected to the system bus 1240 via an appropriate interface.

Figure 13:
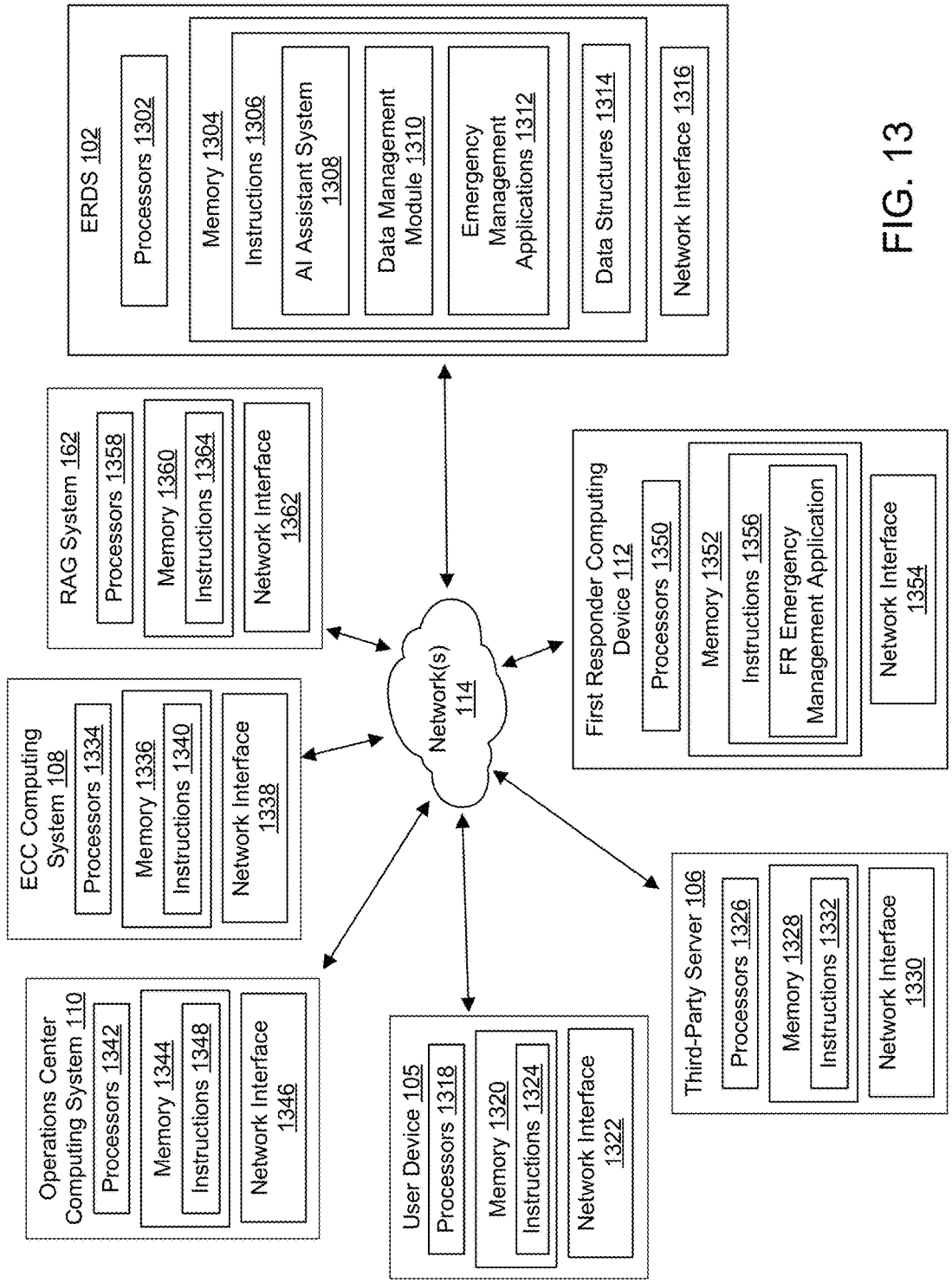
FIG. 13 illustrates an example diagram of an emergency response digital assistant system, in accordance with embodiments of the disclosure.

FIG. 13 illustrates an example diagram of an emergency response digital assistant system 1300, in accordance with aspects of the disclosure. Emergency response digital assistant 1300 includes processing logic, (computer-readable) instructions, and memory that may be distributed across servers, one or more computing centers, and/or one or more cloud computing centers, according to various implementations of the disclosure. Emergency response digital assistant system 1300 may include emergency response data system 102, user device 105, third-party server 106, ECC computing system 108, operations center computing system 110, first responder computing device 112, and RAG system 162 communicatively coupled to each other through one or more networks 114, which may each be an example implementation of machine 1200 (shown in FIG. 12), in accordance with various embodiments of the disclosure.

Emergency response data system (ERDS) 102 may include one or more processors 1302, memory 1304, and network interface 1316 to support operations. Memory 1304 may store instructions 1306 that may be executed by processors 1302, according to an embodiment. Instructions 1306 may include one or more aspects of an AI assistant system 1308, a data management module 1310, and emergency management applications 1312. One or more data structures 1314 to support operations of ERDS 102.

User device 105 may include one or more processors 1318, memory 1320, and network interface 1322 to support operations. Memory 1320 may store instructions 1324 that may be executed by processors 1302, according to an embodiment.

Third-party server 106 may include one or more processors 1326, memory 1328, and network interface 1330 to support operations. Memory 1328 may store instructions 1332 that may be executed by processors 1326, according to an embodiment.

ECC computing system 108 may include one or more processors 1334, memory 1336, and network interface 1338 to support operations. Memory 1336 may store instructions 1340 that may be executed by processors 1334 to support operation of an ECC emergency management application, according to an embodiment.

Operations center computing system 110 may include one or more processors 1342, memory 1344, and network interface 1346 to support operations. Memory 1344 may store instructions 1348 that may be executed by processors 1342 to support operation of an operations center emergency management application, according to an embodiment.

First responder computing device 112 may include one or more processors 1350, memory 1352, and network interface 1354 to support operations. Memory 1352 may store instructions 1356 that may be executed by processors 1350 to support operation of a first responder emergency management application, according to an embodiment.

RAG system 162 may include one or more processors 1358, memory 1360, and network interface 1362 to support operations. Memory 1360 may store instructions 1364 that may be executed by processors 1358 to run one or more aspects of AI operations, according to an embodiment.

While this disclosure contains many specific implementation details, these should not be construed as limitations on the scope of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous.

References to "or" may be construed as inclusive so that any terms described using "or" may indicate any of a single, more than one, and all of the described terms. The labels "first," "second," "third," and so forth are not necessarily meant to indicate an ordering and are generally used merely to distinguish between like or similar items or elements.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

The term "logic" and/or "processing logic" in this disclosure may include one or more processors, microprocessors, multi-core processors, application-specific integrated circuits (ASIC), and/or field programmable gate arrays (FPGAs) to execute operations disclosed herein. In some embodiments, memory may be integrated into the logic to store instructions to execute operations and/or store data. Logic may also include analog or digital circuitry to perform the operations in accordance with embodiments of the disclosure.

A "memory" or "memories" described in this disclosure may include one or more volatile or non-volatile memory architectures. The "memory" or "memories" may be removable and non-removable media implemented in any method or technology for storage of information such as computer-readable instructions, data structures, program modules, or other data. Example memory technologies may include RAM, ROM, EEPROM, flash memory, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device.

A computing device or system may include a desktop computer, a laptop computer, a tablet, a phablet, a smartphone, a feature phone, a server computer, or otherwise. A server computing system may be located remotely in a data center, may be stored locally, and/or may have components (e.g., processors, memory, network interfaces, etc.) that are distributed across one or more locations.

The processes explained above are described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application-specific integrated circuit ("ASIC") or otherwise.

A tangible non-transitory machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An emergency response assistant system, comprising:
   an application server configured to provide data for an emergency management application;
   a data retrieval system configured to transform emergency response procedure data into emergency response procedure data vectors;
   a vector database configured to store the emergency response procedure data vectors; and
   an augmentation and generation system configured to:
      determine one or more characteristics of a 911 call made to an emergency communications center (ECC);
      provide a prompt to an artificial intelligence (AI) model to perform a search of the vector database for a portion of the emergency response procedure data relevant to the one or more characteristics of the 911 call;
      receive results from the search; and
      provide the results to the emergency management application to display emergency response procedure suggestions on a user interface (UI) of the emergency management application operated by at least one of at an ECC computing system, an operations center computing system, or a first responder computing device.

2. The emergency response assistant system of claim 1, wherein the augmentation and generation system is further configured to:
   perform a hybrid search with a text-based search of the emergency response procedure data in addition to the vector search.

3. The emergency response assistant system of claim 1, wherein the augmentation and generation system is further configured to:
   receive additional data from a plurality of data sources; and
   perform the vector search at least partially based on the additional data.

4. The emergency response assistant system of claim 3, wherein the augmentation and generation system is further configured to:
   apply at least part of the additional data to the AI model; and
   prompt the AI model to suggest a dispatcher determinant code for an incident based on the additional data.

5. The emergency response assistant system of claim 3, wherein the additional data includes at least one of: live call data, call data, sensor data, location data, building data, telematics data, floor plan data, geofence data, ambient conditions data, public records data, or public record data.

6. The emergency response assistant system of claim 1, wherein determine the one or more characteristics of a 911 call includes apply call audio data of the 911 call to the AI model.

7. The emergency response assistant system of claim 1, wherein the results include suggestions, actions, or notifications for a user of the ECC computing system, the operations center computing system, or the first responder computing device.

8. The emergency response assistant system of claim 1, wherein the augmentation and generation system is configured to:
   perform an emergency response action;
   display on the UI a notification of the emergency response action; and
   provide on the UI a cancellation button to enable a user to cancel the emergency response action.

9. The emergency response assistant system of claim 1, wherein the emergency response procedure data includes one or more of automotive manuals, appliance manuals, first aid procedures, poison control information, evacuation routes, application programming interface (API) calls, public safety standard operating procedures (SOPs), electric vehicle emergency protocols, response plans for specific buildings, floor plans, building staff schedules, or incident response plans.

10. The emergency response assistant system of claim 1, further comprising:
    a transcription engine configured to provide transcripts to the AI model from audio data.

11. A computer-implemented method of providing digital emergency response assistance, comprising:
    detecting a trigger event related to an emergency response procedure;
    identifying one or more characteristics of the trigger event by prompting a large language model (LLM) to analyze call data, live audio call data, radio dispatch transcription data, or sensor data related to the trigger event;
    conditioning emergency response procedure data into emergency response procedure data vectors;
    storing the emergency response procedure data vectors in a vector database;
    prompting the LLM to search the vector database based on the one or more characteristics of the trigger event to identify a portion of the emergency response procedure data vectors that are relevant to the trigger event;
    receiving results from the search of the vector database; and
    displaying at least part of the results on a user interface of an emergency management application to provide emergency response procedure suggestions to a user of an ECC computing system, an operations center computing system, or a first responder computing device.

12. The computer-implemented method of providing digital emergency response assistance of claim 11, wherein the trigger event is at least one of a 911 call to the ECC, a call to an operations center, or the sensor data.

13. The computer-implemented method of providing digital emergency response assistance of claim 11, wherein conditioning the emergency response procedure data includes parsing, cleaning, chunking, and embedding the emergency response procedure data.

14. The computer-implemented method of providing digital emergency response assistance of claim 11, wherein the emergency response procedure data is based on one or more of automotive manuals, appliance manuals, first aid procedures, poison control information, evacuation routes, application programming interface (API) calls, public safety standard operating procedures (SOPs), electric vehicle emergency protocols, response plans for specific buildings, floor plans, building staff schedules, or incident response plans.

15. The computer-implemented method of providing digital emergency response assistance of claim 11, further comprising:
receiving the live audio call data from a first audio transmitter communicatively coupled to the ECC computing system; or
receiving the live audio call data from a second audio transmitter communicatively coupled to the operations center computing system.

16. The computer-implemented method of providing digital emergency response assistance of claim 11, further comprising:
receiving sensor data related to the trigger event;
providing the sensor data to the LLM; and
prompting the LLM to generate an insight that is based on the sensor data, the trigger event, and contents of the vector database.

17. The computer-implemented method of providing digital emergency response assistance of claim 16, wherein prompting the LLM includes prompting the LLM to generate the insight specifically for a firefighter, a police officer or an emergency medical technician.

18. The computer-implemented method of providing digital emergency response assistance of claim 16, wherein prompting the LLM includes prompting the LLM to generate the insight specifically for a public safety answering point dispatcher.

19. A computer-implemented method of providing digital emergency response assistance, comprising:
converting, with transformer logic, emergency response procedure data into emergency response procedure data vectors;
storing the emergency response procedure data vectors in a vector database;
receiving audio data for a 911 call to an emergency communications center (ECC);
prompting an artificial intelligence (AI) model to determine one or more characteristics of the 911 call, wherein the one or more characteristics of the 911 call include a nature of the 911 call, caller demographics, an address extracted from the 911 call, and a first responder type;
prompting the AI model to search the vector database to identify a portion of the emergency response procedure data that is relevant to the one or more characteristics of the 911 call;
receiving results from the AI model; and
displaying at least part of the results on a user interface (UI) of an emergency management application to provide emergency response procedure suggestions to a user of at least one of an ECC computing system, an operations center computing system, or a first responder computing device.

20. The computer-implemented method of providing digital emergency response assistance of claim 19, wherein the emergency response procedure data includes one or more of automotive manuals, appliance manuals, first aid procedures, poison control information, evacuation routes, application programming interface (API) calls, public safety standard operating procedures (SOPs), electric vehicle emergency protocols, response plans for specific buildings, floor plans, building staff schedules, or incident response plans.

21. The computer-implemented method of providing digital emergency response assistance of claim 19, further comprising:
receiving sensor data related to the 911 call;
providing the sensor data to the AI model;
prompting the AI model to generate an insight that is based on the sensor data and contents of the vector database; and
displaying the insight on the UI.

* * * * *